United States Patent
Hatami-Hanza

(10) Patent No.: US 8,612,445 B2
(45) Date of Patent: Dec. 17, 2013

(54) SYSTEM AND METHOD FOR A UNIFIED SEMANTIC RANKING OF COMPOSITIONS OF ONTOLOGICAL SUBJECTS AND THE APPLICATIONS THEREOF

(75) Inventor: Hamid Hatami-Hanza, Thornhill (CA)

(73) Assignee: Hamid Hatami-Hanza, Thornhill, Ontario (CA)

( * ) Notice: Subject to any disclaimer, the term of this patent is extended or adjusted under 35 U.S.C. 154(b) by 646 days.

(21) Appl. No.: 12/755,415

(22) Filed: Apr. 7, 2010

(65) Prior Publication Data
US 2010/0293166 A1   Nov. 18, 2010

Related U.S. Application Data

(60) Provisional application No. 61/177,696, filed on May 13, 2009.

(51) Int. Cl.
G06F 17/30 (2006.01)

(52) U.S. Cl.
USPC ........... 707/737; 707/738; 707/739; 707/748; 707/769

(58) Field of Classification Search
USPC ........................ 707/739, 737, 769, 748, 738
See application file for complete search history.

(56) References Cited

U.S. PATENT DOCUMENTS

| | | | |
|---|---|---|---|
| 5,768,937 A * | 6/1998 | Wajid et al. | 73/24.06 |
| 7,496,593 B2 * | 2/2009 | Gardner et al. | 707/999.01 |
| 2006/0031217 A1 * | 2/2006 | Smith et al. | 707/5 |
| 2007/0130561 A1 * | 6/2007 | Siddaramappa et al. | 717/106 |
| 2008/0226675 A1 * | 9/2008 | Xu | 424/208.1 |
| 2009/0036315 A1 * | 2/2009 | Labgold et al. | 506/1 |
| 2009/0083257 A1 * | 3/2009 | Bargeron et al. | 707/5 |
| 2009/0186658 A1 * | 7/2009 | Jiang et al. | 455/562.1 |
| 2010/0185716 A1 * | 7/2010 | Nakamura et al. | 708/650 |
| 2011/0264699 A1 * | 10/2011 | Antonelli et al. | 707/777 |

* cited by examiner

Primary Examiner — Wilson Lee
Assistant Examiner — Thuy Bui

(57) ABSTRACT

The present invention discloses methods, systems, and tools for unified semantic ranking of compositions of ontological subjects. The method breaks a composition into a plurality of partitions as well as its constituent ontological subjects of different orders and builds a participation matrix indicating the participation of ontological subjects of the composition in other ontological subjects, i.e. the partitions, of the composition. Using the participation information of the ontological subjects into each other a similarity matrix is built from which the semantic importance ranks of the partitions of the composition are calculated. The method, systematically, enables the calculation of semantic ranks of the ontological subjects of different orders of the composition. Various systems for implementing the method and numerous applications and services are disclosed.

36 Claims, 14 Drawing Sheets

US 8,612,445 B2

SYSTEM AND METHOD FOR A UNIFIED SEMANTIC RANKING OF COMPOSITIONS OF ONTOLOGICAL SUBJECTS AND THE APPLICATIONS THEREOF

CROSS-REFERENCED TO RELATED APPLICATIONS

This application claims priority from U.S. provisional patent application No. 61/177,696 filed on May 13, 2009, which is incorporated herein by reference.

FIELD OF INVENTION

This invention generally relates to information processing, ontological subject processing, knowledge processing and discovery, knowledge retrieval, artificial intelligence, ontology organization and applications, and ranking of ontological subjects and the applications.

BACKGROUND OF THE INVENTION

So far, because of the complexity of each application, the ranking methods of documents and contents are various and many in numbers. Currently the ranking and summarization relies mostly on superficial indication of importance of a composition or its components usually by utilizing the signs of the human composer judgment of importance.

For example, at the sentence ranking level, the document summarization method disclosed in the published US patent application 2006/0206806 A1, scores a sentence for inclusion in the summary by evaluating the weighted score of individual words and type of the sentences. The score of the sentences and the individual words is determined by the type of sentence such as being a title sentence, sub-title, or sentence location in a paragraph, plus word features such as the lengths of the word, part of speech type of the word, and word syntax function in a sentence. At the webpage level the PageRank ranking method uses the link referral centrality value of WebPages plus other syntactic and representation of each page such as the frequency of the keyword, its location, font size, and the like in the webpage. These importance factors are basically based on the perceived importance of the creator of the compositions rather than the real substantive value of the compositions itself and therefore these methods can be susceptible to manipulations. More advanced ranking method of textual compositions are based on natural language processing of words and word disambiguation etc. which are very process intensive and still not yielding a satisfactory results.

Moreover these methods of ranking for different level usually involves a huge amount of text processing that is very process intensive and cannot be easily scale up (due to the application specific ranking methods, such as natural language investigations methods) to achieve a fair ranking stand from a very large number of existing and future collections of compositions. However it is desirable to have a ranking method that select the components and the compositions based on the intrinsic value of composition or the partitions thereof in a fair comparison to a huge number of other compositions.

More importantly, at this age of information overload and overabundance, knowledge and information users desire to have the right information or the true knowledge in their fingertips rather than searching through a countless sets of WebPages returned by search engines. Therefore, summarization and distillation of single and multi-composition, or finding the answers to questions from a single or a set of compositions, as well as searching for compositions having the highest substance from collections of compositions, e.g. determining an important gene from a genome, are useful and highly desirable services for users of different groups, having different goals in mind, while exploring for knowledge acquisitioning, and seeking information related to their topic of interest.

Therefore there is a need in the art for unified, systematic, and process efficient ranking methods and the associated systems, which can cover the rankings at all the levels and all types of compositions. More importantly the results should be based on the real substance, semantic and intrinsic knowledge value of the compositions in fair comparisons to other large number of competing compositions for selection of the most appropriate answer to a user request for information or knowledge.

SUMMARY OF THE INVENTION

Many desired applications and services ranging from search engines document retrieval, summarization, distillation, question answering and the like, as well as genomics applications, audio and video signal processing, have their roots on some type of ranking and selection, i.e. filtering, of compositions of ontological subjects or the parts therein. As defined along this disclosure and also in previous patent applications, which is incorporated as reference, an ontological subject means generally any string of characters or symbols such as natural language characters and words and documents to logical zero and one bits or Fourier components in an electrical signal, to the bases of a DNA molecules, the genes, and the whole genome. Ontological subjects in this definition can then be organized or defined in different desired orders based on their length, function, syntactic or semantic roles of such ontological subjects in the composition. The order can also loosely relate to the corresponding composition levels such as word level, sentence level, document level, and the like for a textual composition.

Following this clarification and definition one may notice that many services and applications can be viewed as essentially a ranking and summarization, or filtration, method for different composition levels. Consequently there have been numerous application specific ranking methods of compositions of ontological subjects at different levels or orders.

For example, and for the sake of familiarity, the well known PageRank method, employed by the Google's search engine, ranks the compositions at webpage level by analyzing the link referral of WebPages to each other over the internet and initially the search engine returns a selection of the highest ranked WebPages relevant to a search query (i.e. filtering out some of the WebPages). In another instance, one may summarize a document by selecting some parts of the document by ranking the importance of components or partitions of the documents, usually at the sentence level, and select (passing by the filters) the most appropriate sentences that believed to adequately represent the essence of a document. As another instance, finding a gene in DNA sequence involves finding the most import piece of the DNA code and selecting them for further investigations.

Whether the service or the request is a summarization of single document, or searching the internet for the most relevant document to a query, posing a question to a question answering service provider and receiving one or more statement as the answer, or finding a gene in DNA sequence; one faces the challenge of how to select the most appropriate output among many possible, and very often equally qualified, outputs. Therefore, all these services can be viewed as essentially a ranking and summarization, i.e. filtering, method and process performed at the different levels for sets of compositions.

Sets of ontological subjects (OSs) are ordered based on their length and function. For instance, for ontological subjects of textual nature, one may characterizes letters as the zeroth order OS, words as the first order, sentences as the second order, paragraphs as the third order, pages or chapters as the forth order, documents as the fifth order, corpuses as the sixth order OS and so on. Equally one can order the genetic codes in different orders of ontological subjects. For instance, the 4 basis of a DNA molecules as the zeroth order OS, the base pairs as the first order, pieces of DNA as the second order, the genes as the third order, chromosomes as the forth order, the genomes as the fifth order, sets of similar genomes as the sixth order, and so on. Yet the same can be defined for information bearing signals such as analogue and digital signal representing text, audio or video information. For instance for digital signals representing a video signal, bits (electrical One and Zero) can be defined as zeroth order OS, the bytes as first order, any predetermined sets of bytes as third order, and sets of predetermined sets of bytes, e.g. a frame, as forth order OS and so on.

In this way any information bearing OS is in fact a composition, i.e. combination, of lower order OSs. For example a text book document is composed of chapters, pages, paragraphs, sentences, words and letters.

For the sake of clarification and ease of explanation we focus on ontological subjects of textual nature and mostly for natural language texts for their importance. However, one can easily extend the teachings of the method and the associated system to other forms of ontological subject of different nature for the corresponding applications, For instance, in genomics applications the method can be readily and effectively used for fast DNA analysis, ranking and determining the dominant genes, gene discovery etc., as well as other genetic engineering applications such as fast genomic summarization, fast genomics identification and discovery, fast genetic engineering, and the like. Moreover, for other equally important applications the method and system can be extended and used. For example, in signal processing applications the method and the associated system may be employed for variety of applications such as voice and video recognition, voice and video/image comparison, feature extraction, picture/image recognition such as face or scene recognition and the like.

Consequently a method and system of ranking the Ontological Subjects of different order is disclosed that can be used for different applications such as graph representation of compositions, question answering, composition summarization/distillation, document ranking and retrieval, composition clustering, novelty detection, and document or Corpuses comparison and the like.

In this disclosure the ranking method of OSs of different length, i.e. different order, is done by partitioning a composition or breaking the OS, e. g. a text composition, into its lower order constituent OSs. Thereafter, constructing at least one Participation Matrix (PM) which indicates participation of a number of OSs, having lower order, into a number of OSs having usually a higher order, or a number of partitions of the compositions. So if one indicates the rows of the PM with the lower order constituent OSs, then the column of the PM, i.e. a vector having preferably at least one non-zero entry, represents the higher order OSs. This matrix carries the information of participation patterns of ontological subjects to each other, and is used for fast and efficient scoring and ranking the semantic importance of the ontological subjects of different order of a composition.

Using the at least one participating matrix few embodiments are introduced to rank the OSs of different orders. In one embodiment, the ranking of OSs is done by the proposed concept of Semantic Coverage Extent Number (SCEN). In essence and according to a preferred embodiment, the SCEN indicates the semantic coverage extent of an OS within the set of OSs of the same order by calculating the cumulative similarity measures of OSs to each other in the set.

One can calculate and evaluate the SCEN from the participation information of lower order OSs in the set of higher order OSs or partitions, which are embedded in the PM. The SCEN is calculated and evaluated by measuring the similarities of higher orders OSs, or partitions, to all other OSs of same order, or other partitions, and adding them together. The OS which has the highest coverage number, i.e. the highest SCEN, has the highest rank in that set of OSs of same order. Higher SCEN means, usually, more credibility and substantiation. However different ranges of SCEN are indicatives of different features. For instance, a low SCEN can be either interpreted as a noise or as a novel piece of knowledge which needs to be looked at more closely.

In another alternative embodiment, the OSs are ranked based on the proposed concept of Centrality Power Number (CPN). The CPN of OSs can be directly evaluated from the graph, or the map, that represent the similarity/association matrix, which is derived from the PM, and consequently is employed to rank the higher order OSs. In this embodiment generally the OSs are ranked based on their centrality value in a graph whose adjacency matrix is the similarity or association matrix or any other nodal relationship between the OSs that can be derived from the PM. This embodiment is particularly important and useful for those application that the knowledge of importance of the lower order OSs is crucial such as the applications in the genetics engineering in which the impact and importance of individual parts of the DNA is important for synthesizing or engineering a new gene or knowledge of individual genes are important to study the whole genome.

In yet another embodiment the two methods are combined to rank the Semantic Importance Ranks (SIR) of sets of OSs. Several other exemplary embodiments, with various approaches, are also revealed to describe the method and system in more details. Having ranked a set of OSs of same order from the participation information of lower order set of OSs, one may proceed with ranking yet higher order OSs, e.g. any combination of lower order OSs, as described in the detailed descriptions. For instance, importance scores of the words employed in a composition are important to identify the most important sentences of the composition. In a similar manner, having the ranks or scores of the sentences employed in a collection of documents can be used to identify the most important document, e.g. the document which has the higher number of important sentences.

In yet another exemplary embodiment, using the SCEN method or a dictionary, each set of semantically similar ontological subjects, e.g. synonym sets, is replaced with one common ontological subject in the participation matrix thereby increasing the similarity of semantically similar partitions. Consequently the SCEN values of semantically similar OSs are amplified making it easier to filter out the desired OSs from the set while reducing the processing complexity, time, energy, and the cost significantly.

The advantage of using the information of PM in ranking the OSs of different orders or, i.e. the compositions and their partitions, is that the method is language independent making it applicable for a diverse range of applications while demonstrating a high processing deficiency. In another words, the syntactic rules of the words do not play a very important role in the disclosed algorithms, method and the system, and therefore the method is first of all language independent and secondly much simpler and clearer for processing purposes while the yielded results are robust and satisfactorily useful.

Therefore in essence using the participation information of a set of lower order OSs into a set of the same or higher order OSs one has the unified method and process of ranking compositions of Ontological Subject at different levels, i.e. orders. Depends on the desired application one can use the applicable and desirable embodiments for the intended application such as web page ranking, document clustering, single and multi document summarization/distillation, question answering, graphical representation of the compositions, knowledge discovery, novelty detection, composing new compositions, engineering new compositions, composition comparison, as well as other areas such as genetic analysis and synthesize, signal processing and the like.

In another aspect the invention provides an exemplary system of text summarization, distillation and simplification, and question answering and analysis, comprising computer hardware, software, internet, storage medium, datacenters, servers or server farms, and other customary appliances of an E business to perform and execute the said method for a user requesting a service.

DETAILED DESCRIPTION

Figure 1:
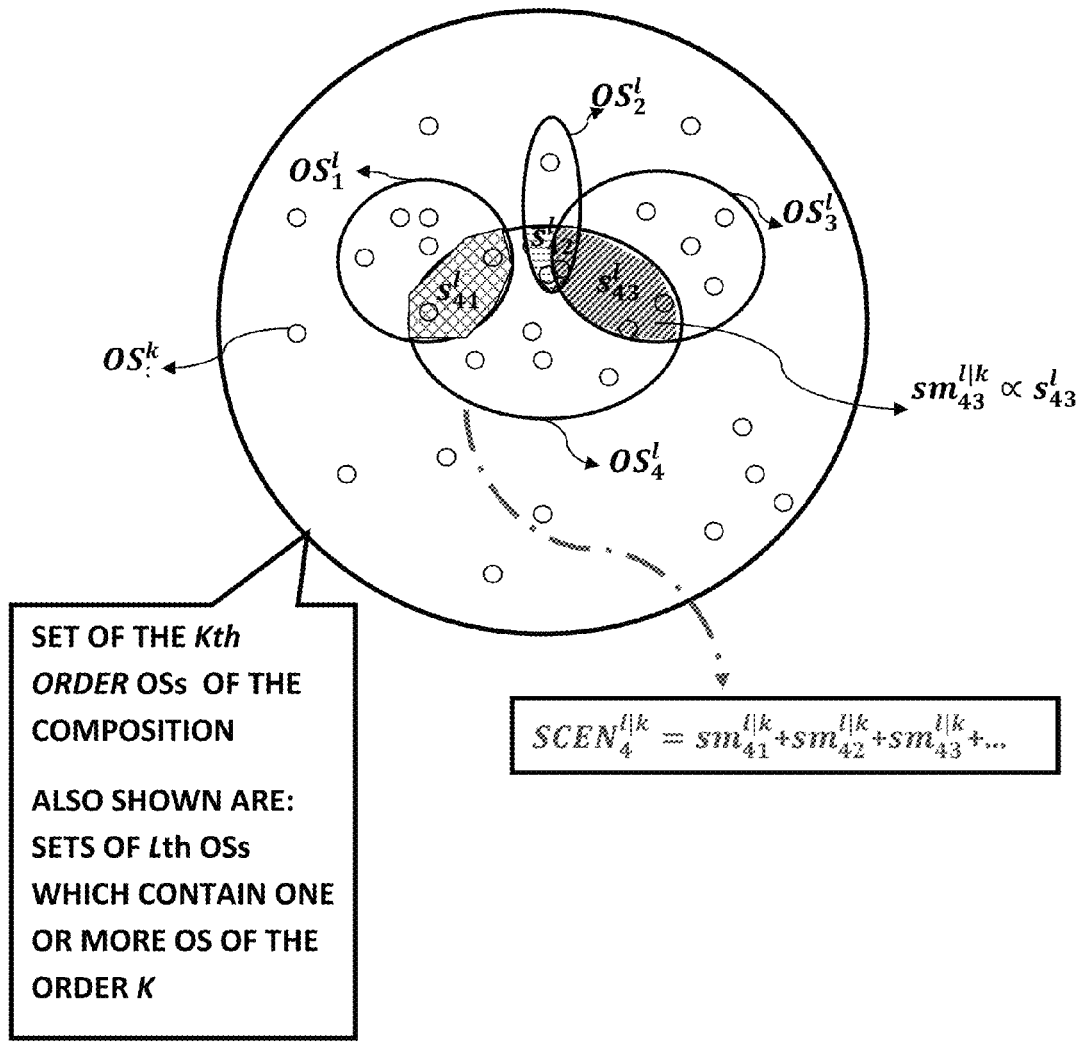
FIG. 1: shows one exemplary illustration of the concept of Semantic Coverage Extent of Ontological Subjects (OSs) of a composition as the sum of the cross-coverage (e.g. similarity measure) of OSs.

The description starts by defining the terms that are used frequently throughout the disclosure and are helpful to grasp the scope, methods, and the systems disclosed here. The description then is given in several sections followed after the definitions section.

I—Definitions:
1. Ontological Subject: symbol or signal referring to a thing worthy of knowing about. Therefore Ontological Subject means generally any string of characters, but more specifically letters, numbers, words, bits, mathematical functions, sound signal tracks, video signal tracks, electrical signals, chemical molecules such as DNAs and their parts, or any combinations of them, and more specifically all such string combinations that indicates or refer to an entity, concept, quantity, and the incidences of such entities, concepts, and quantities. In this disclosure Ontological Subject/s and the abbreviation OS or OSs are used interchangeably.

Moreover, Ontological Subjects can be divided into sets with different orders depends on their length and/or function. For instance, for ontological subjects of textual nature, one may characterizes letters as the zeroth order OS, words as the first order, sentences as the second order, paragraphs as the third order, pages or chapters as the forth order, documents as the fifth order, corpuses as the sixth order OS and so on. So a higher order OS is a set of lower order OSs.

Equally one can divide and order the genetic codes with different orders of ontological subjects. For instance, the 4 basis of a DNA (denoted by four letter alphabet: A,C, G,T) or RNA(A,C,G,U) molecules (i.e. four chemical bases of: adenine, thymine, guanine, and cytosine in the DNA plus uracil instead of thymine in the case of RNA) can be regarded as the zeroth order OS, the base pairs as the first order, the set of three bases known as codon as the second order, pieces of DNA as the third order, genes as the forth order, chromosomes as the fifth order, the genomes as the sixth order, the sets of similar genomes as the seventh order, and so on.

Yet the same can be defined for information bearing signals such as analogue and digital signals representing audio or video information. For instance for digital signals representing a video signal, bits (electrical One and Zero) can be defined as zero order OS, the bytes as first order, any sets of bytes as third order, and sets of sets of bytes, e.g. a frame, as forth order OS and so on. Yet as another example the pixels of an image, or video, can be regarded as an OS of particular order and an arbitrary set of these pixels (usually, for instance, the neighboring pixels or sequential pixels) can be regarded as an OS with another particular order.

However, these methods of ordering the ontological subjects are exemplary but important and meaningful. One can partition the text, genetic codes, and digital signals in different orders without limiting the scope of the invention.

More importantly Ontological Subjects can be stored, processed, manipulated, and transported only by transferring, transforming, and using matter or energy (equivalent to matter) and hence the OS processing is a physical transformation of materials and energy.

2. Composition: is an OS composed of ontological subjects of lower or the same order, i.e. a set of the same but most often lower order OSs, particularly text documents written in natural language documents, genetic codes, encryption codes, data files, voice files, video files, and any mixture thereof. A collection, or a set, of compositions is also a composition. A composition is also an Ontological Subject which can be broken to lower order constituent Ontological Subjects. In this disclosure, the preferred exemplary composition is a set of data representing or containing ontological subjects such as a webpage, a set of webpages, a group of medical reports, content of database, one or more PDF articles, one or more books, multimedia files, or simply words and phrases or in the extreme case the whole internet content.

3. Partitions of composition: a partition of a composition, in general, is a part or whole, i.e. a subset, of a composition or collection of compositions. Therefore, a partition is also an Ontological Subject having the same or lower order than the composition when, the composition itself, is regarded as OS. More specifically in the case of textual compositions, partitions of a composition can be characters, words, sentences, paragraphs, chapters, webpage, etc. A partition of a composition is also any string of symbols representing any form of information bearing signals such as audio or videos, texts, DNA molecules, genetic letters, genes, and any combinations thereof. However our preferred exemplary definition of a partition of a composition in this disclosure is word, sentence, paragraph, page, chapters and the like, or WebPages, and partitions of a collection of compositions can moreover include one or more of the individual compositions.

4. Ranking: ranking or scoring, is assigning a number to one or more significance aspects of an OS, or estimating a value for a feature of an OS, or assigning a metric quantity to an OS among a set of OSs so as to assist the selection of one or more of the OSs from the set. More conveniently and in most of the important cases the ranking is assigning an importance number to a partition of a composition.

Such ranking and scoring, for instance, is indicative of semantic significance of a partition of a composition.

5. Summarization: is a process of selecting one or more OS from one or more sets of OSs according to predetermined criteria with or without the help of ranking values. The selection of one or more OS from a set of OSs is usually done for the purposes of representation of a body of data by a summary as an indicative of that body. Specifically, therefore, in this disclosure searching through a set of partitions or compositions, and showing the search results according to the predetermined criteria is considered a form of summarization. In this view finding an answer to a query, e.g. question answering, or finding one or more relevant documents, from a database, or webpages from the internet, are all forms of searching through a set of partitions and therefore a form of summarization according to the given definitions here.

II—Description

Although the method is general with broad applications and implementation schemes, the disclosure is described by way of specific exemplary embodiments to consequently describe the implications and applications in the simplest form of embodiments and senses.

Also since most of human knowledge and daily information production is recorded in the form of text (or it can be converted to ordinary texts or textual symbols and characters), the detailed description is focused on textual compositions to illustrate the teachings and the method and the system. In what follows the invention is described in several sections and steps which in light of the previous definitions would be sufficient for those ordinary skilled in the art to comprehend and implement the method and the systems and the applications.

II-I Participation Matrix Building for a Composition

Assuming we have an input composition of ontological subjects, the Participation Matrix (PM) is a matrix indicating the participation of each ontological subject in each partitions of the composition. In other words in terms of our definitions, PM indicate the participation of one or more lower order OS into one or more OS of higher or the same order. PM is the most important array of data in this disclosure containing the raw information, representing a participation pattern, from which many other important functions, information, features, and desirable parameters can be extracted. Without intending any limitation on the value of PM entries, in the preferred embodiments throughout most of this disclosure (unless stated otherwise) the PM is a binary matrix having entries of one or zero and is built for a composition or a set of compositions as the following:

1. break the composition to a desired M number of partitions. For example, for a text document we can break the documents into chapters, pages, paragraphs, lines, and/or sentences, words etc.,
2. identify the desired form, number, and order of the ontological subject of the composition by appropriate method such as parsing a text documents into its constituent words and phrases, sentences, etc.,
3. select a desired N number of OSs of order k and a desired M number of OSs of order l (these OSs are usually the partitions of the composition from the step 1) existing in the composition, according to certain predetermined criteria, and;
4. construct a binary N×M matrix in which the ith raw ($R_i$) is a binary vector, with dimension M, indicating the presence of the ith OS of order k, (often extracted from the composition under investigation), into the OSs of order l, (often extracted from the same or another composition under investigation), by having the value of one, and not present by having the value of zero.

We call this binary matrix the Participation Matrix of the order kl ($PM^{kl}$) which is shown as:

$$PM^{kl} = \begin{matrix} & OS_1^l & \cdots & OS_M^l \\ OS_1^k & \begin{pmatrix} pm_{11}^{kl} & \cdots & pm_{1M}^{kl} \\ \vdots & \ddots & \vdots \\ pm_{N1}^{kl} & \cdots & pm_{NM}^{kl} \end{pmatrix} \\ \vdots & & \\ OS_N^k & & \end{matrix} \quad (1)$$

where $OS_i^l$ is the ith OS of the lth order, $OS_i^k$ is the ith OS of the kth order, extracted from the composition, and $pm_{ij}^{kl}=1$ if $OS_i^k$ have participated, i.e. is a member, in the $OS_j^l$ and 0 otherwise.

The participating matrix of order lk, i.e. $PM^{lk}$, can also be defined which is simply the transpose of $PM^{kl}$ whose elements are given by:

$$PM_{ij}^{lk} = PM_{ji}^{kl} \qquad (2).$$

Accordingly without limiting the scope of invention, the description is given by exemplary embodiments using only the general participation matrix of the order kl, i.e the $PM^{kl}$.

Other information and added dimensions can also be shown by more specialized PMs or sets of PMs of same order that showing other features such as the place of an OSs in another OSs (temporal and spatial), syntactic role, part of speech, etc. For example, in a natural language text composition, an adjective participation matrix (lets call it APM) can be imagined in which if $OS_i^k$ has participate $OS_j^l$ and its syntactic rule has been an adjective (e.g. consider $OS_i^k$ is a word and $OS_j^l$ is a sentence) then the $APM_{ij}^{kl}=1$. Therefore, those skilled in the art can build or devise many other forms of participation matrixes depends on their applications.

II-II—Ranking the Ontologica Subjects Using the Semantic Coverage Extent Number (SCEN)

According to one of the embodiment of this invention we use the PM to construct another matrix called Similarity (also may be called Correlation or Association) Matrix of OSs of order l expressed versus the OSs of order k, which we denote by $SM^{l|k}$ (l|k reads: l given k).

The $SM^{l|k}$ is given by:

$$SM^{l|k}(OS_i^l, OS_j^l) = sm_{i,j}^{l|k} = f(C_i^{kl}, C_j^{kl}) \qquad (3)$$

where $SM^{l|k}$ is the similarity matrix of OSs of order l derived based on the participations of OSs of order k, $C_i^{kl}$ and $C_k^{kl}$ are the ith and jth column of the $PM^{kl}$, and $f$ is a predefined function or operator of the two vectors $C_i^{kl}$ and $C_k^{kl}$. The function $f$ yields the desired similarity measure and usually is proportional to the inner product or scalar multiplication of the two vectors. The similarity matrix of order l|k (i.e. l given k), $SM^{l|k}$, has the form of:

$$SM^{l|k} = \begin{matrix} & \begin{matrix} OS_1^l & \cdots & OS_M^l \end{matrix} \\ \begin{matrix} OS_1^l \\ \vdots \\ OS_M^l \end{matrix} & \begin{pmatrix} sm_{11}^{l|k} & \cdots & sm_{1M}^{l|k} \\ \vdots & \ddots & \vdots \\ sm_{M1}^{l|k} & \cdots & sm_{MM}^{l|k} \end{pmatrix} \end{matrix} \qquad (4)$$

The $SM^{l|k}$ is a M×M symmetric matrix and in one preferred embodiment the entries is given by:

$$sm_{ij}^{l|k} = \frac{c_i^{kl} \cdot c_j^{kl}}{\|c_i^{kl}\| \cdot \|c_j^{kl}\|} \text{ and } i, j \leq M, \qquad (5)$$

where the $C_j^{kl}$ is ith column and $C_j^{kl}$ is the jth column of the matrix $PM^{kl}$. Eq. (5) is the cosine similarity, i.e. correlation, measure and in fact shows the similarity between each two partitions of the composition and is between zero and one.

Alternatively, in many cases the similarity measure is more justified if one uses the following formula:

$$sm_{ij}^{l|k} = \frac{c_i^{kl} \wedge c_j^{kl}}{c_i^{kl} \vee c_j^{kl}} \text{ and } i, j \leq M, \qquad (6)$$

where $C_i^{kl} \wedge C_j^{kl}$ is the number of common OSs of order k between $C_i^{kl}$, i.e. $OS_i^l$, and $C_j^{kl}$, i.e. $OS_j^l$ (the inner product of binary vectors of $C_i^{kl}$ and $C_j^{kl}$) and $C_i^{kl} \vee C_j^{kl}$ is the total number of unique OSs of order k for the combined $C_i^{kl}$, i.e. $OS_i^l$, and $C_j^{kl}$, i.e. $OS_j^k$ (i.e. the summation of logical OR of binary vectors of $C_i^{kl}$ and $C_j^{kl}$).

Nevertheless one straight-forward and process efficient similarity matrix can be given by:

$$SM^{l|k} = (PM^{kl})' * PM^{kl} \qquad (7)$$

where "'" and "*" are matrix transposition and multiplication operations respectively. When $PM^{kl}$ has binary entries only, the similarity coefficients of $sm_{ij}^{l|k}$, in the Eq. (7), are basically sum or the number of the common ontological subjects between the partition or columns $C_i^{kl}$ and $C_j^{kl}$.

However, alternatively, as can be seen, the similarity matrix of order k|l (i.e. k given l), $SM^{k|l}$, is a N×N matrix which is derived in a similar fashion from the lk order participating matrix, i.e. $PM^{lk} = (PM^{kl})'$. When k≤l the similarity matrix of $SM^{l|k}$ has more meaning of Correlation Matrix for the $OS^l$, and the similarity matrix of $SM^{k|l}$ has more meaning of the Association Matrix for the $OS^k$.

Accordingly again, without limiting the scope of invention, the description is given by exemplary embodiments using only the general participation matrix of the order lk, i.e the $PM^{kl}$.

Turing back to the SM, the importance of the SM, however, is due to the observation that from the SM one can measure the impact of each partition of the composition by summing over each row of the similarity matrix, (as will be explained in regards to FIG. 1). Hence, using the similarity matrix of order l, we proceed with introducing the concept of Semantic Coverage Extent Number (SCEN) and using it to directly evaluate the intrinsic importance of the individual partitions, i.e. OSs of order l, of the composition that the $PM^{kl}$ has been built from. In this embodiment the SCEN is the cumulative similarity of an OS, e.g. $OS_i^l$, to all other OSs of the same order in the given composition which is given by:

$$SCEN(OS_i^l | OS^k) = SCEN_i^{l|k} = \sum_{j=1}^{M} sm_{ij}^{l|k} \qquad (8)$$

The SCEN, as the name implies, is an indication of semantic coverage extent and can be viewed as a measure of importance, impact, and essentiality of a partition ($OS_i^l$), or generally as one significance aspect of a partition in the set of partitions of a composition. More importantly the SCEN is one indication of consistency, persistency, substance, solidity, and perseverance of the semantic of a partition in a composition. Therefore, the partitions scoring high SCENs are usually the most credible pieces of information found in the composition, and/or are the best rounded, coherent, and harmonized pieces of the composition. Therefore, the SCEN is one indication of overall consistency of a partition as a measure that how much and how many other partitions are harmonized and semantically inclined with that partition.

The SCEN therefore can be used for ranking and consequently rearrangement of the $OS_i^l$, for different applications which involves selection of partitions of the composition such as single or multiple document summarization, web page ranking, answering questions and the like.

For further illustration we now refer to FIG. 1. FIG. 1 schematically is exemplifying and further illustrating the concept of $SCEN_i^{l|k}$ which is proportional to sum of the overlap areas of sets of OSs of lth order having members from the kth order OSs of the composition. In FIG. 1, the overlapped areas between OSs of lth are shown by $s_{pq}^l$ where p and q are indexes of their corresponding $OS_p^l$ and $OS_{iq}^l$. For example, the overlap area between $OS_4^l$ and $OS_3^l$ is shown by $s_{43}^l$ in FIG. 1.

However yet, depends on the application, more derivatives of SCEN can be defined. For instance, one can calculate the density of SCEN for each $OS_i^l$ as follow:

$$\text{Denisty SCEN}_i^{l/k} = \text{SCEN}_i^{l/k}/\text{lengt}\square(OS_i^l) \quad (9)$$

where "Density SCEN" stands for SCEN values per unit of length of the $OS^l$. The length here could be simply the number of characters in $OS^l$, when the composition is represented by textual strings, e.g. text content or genetic codes represented by textual characters. Density SCEN is a good measure of importance if one wants to find short but significant partitions of the composition.

II-III—Ranking the Ontologica Subjects Using the Centarlity Power Number (CPN)

In another embodiment of ranking Ontological Subjects of the composition, the participation matrix of $PM^{kl}$ or $PM^{lk}$ is used to calculate the similarity matrix $SM^{l|k}$ or $SM^{k|l}$. In this embodiment the similarity matrix is considered as weighted adjacency matrix for a graph whose node corresponds to $OS^l$ (in the case of $SM^{l|k}$) or $OS^k$ (in the case of $SM^{k|l}$). A Centrality Power Number (CPN) is assigned to each node, e.g. $OS_i^l$, which is given by:

$$CPN(OS_i^l \mid OS^k) = CPN_i^{l|k} = \sum_{j=1}^{M} g_{i,j}(sm_{ij}^{l|k}) \cdot CPN_j^{l|k} \quad (10)$$

where g is a predetermined function which, in most of the cases, is an identity function, (i.e., $g_{i,j}(sm_{ij}^{l|k}) = sm_{ij}^{l|k}$,) and $CPN_i^{l|k}$ is the centrality power value corresponding to $OS_i^l$ as a node in the graph whose adjacency matrix is $SM^{l|k}$. The CPN can be considered as another significance aspect of a partition in the set of partitions of the composition.

Figure 2:
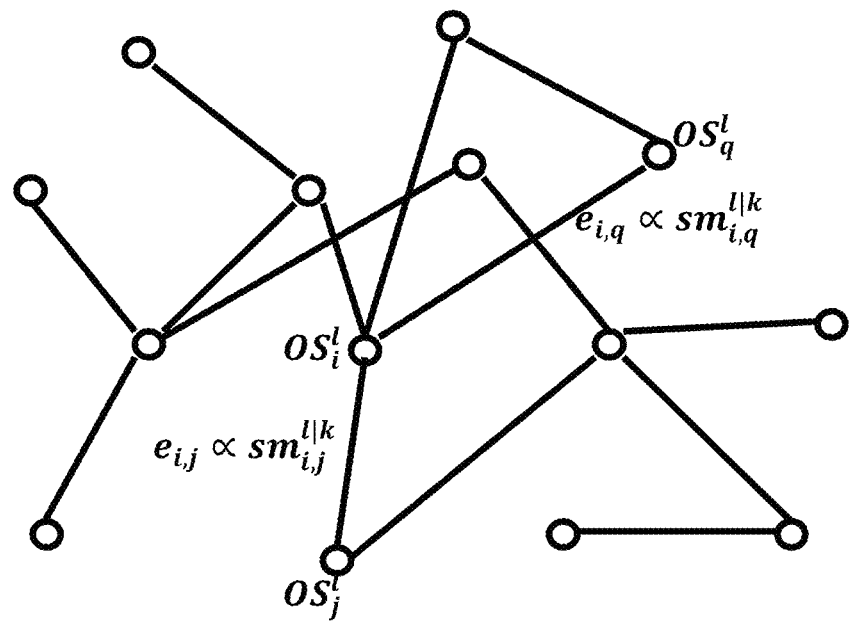
FIG. 2: shows an exemplary illustration of a graph corresponding to the similarity matrix.

FIG. 2 shows an exemplary graph corresponding to the $SM^{l|k}$ as its adjacency matrix. As seen the nodes in this graph are representatives of the OSs, e.g. $OS_i^l$ and $OS_j^l$, and the edges between each two nodes are, generally, proportional to their similarity value, e.g. $sm_{ij}^{l|k}$, which were driven from the participation pattern of $OS^k$ in $OS^l$, i.e. from the $PM^{kl}$. Alternatively the same graph can be built for OSs of order k, e.g. the nodes are $OS_i^k$ and $OS_j^k$ and their edges are similarity values, i.e. $sm_{ij}^{k|l}$ (which are better called as association value when k≤l).

Many other forms of graphs and their corresponding adjacency matrix can be drawn and derived using the similarity matrix information. For example from $sm_{ij}^{l|k}$ one can use the Ontological Subject Mapping (OSM) method to build an association matrix and consequently a directed graph called the Ontological Subject Map (OSM) and arriving at the corresponding adjacency matrix from which the CPN for each $OS_i^l$ can be calculated using Eq. (10). The OSM method was introduced in the patent application entitled" System and method of Ontological Subject Mapping for Knowledge Processing Applications," filed on Aug. 26, 2009, with the application Ser. No. of 12/547,879, by the same applicant, which incorporated herein as reference.

Going back to Eq. (10), as seen the Eq. (10) is an eigenvalue equation which can be rewritten as $$CPN^{l|k} = G^{l|k} \cdot CPN_j^{l|k} \quad (11)$$

which again the $G^{l|k}$ is a general matrix built from $SM^{l|k}$ and in most of the cases can be selected to be the same as $SM^{l|k}$. Since the similarity matrix $SM^{l|k}$ is a symmetric matrix having real value entries, the eigenvalues and the eigenvectors (the CPN) are real and existent.

The CPN is an eigenvector of Eq. (11) indicating the importance of the OSs of the composition which depends on the characteristics of their participation pattern or being participated by other OSs of the composition. The CPN of Eq. (11) can be calculated numerically. Usually the CPN is the same or related to the eigenvector that corresponds to the largest eigenvalue of Eq. (11). For computational reasons the matrix $G^{l|k}$ may further be manipulated to become normalized or transformed to a stochastic matrix. Those skilled in the art can modify the methods to achieve the same goal of ranking the importance of the Ontological Subjects of the composition without departing from the scope and spirit of the present disclosure. For instance alternative ways and sophisticated formulation for calculating and interpreting the power of OSs can be found in the Ser. No. 12/547,879 patent application which is referenced here.

Referring to FIG. 2 again, it shows the graph representation of the similarity matrix $SM^{l|k}$ that was built from the participation matrix of $PM^{kl}$. As seen the $OS^l$ as the node and the edges are proportional to the entries of the similarity matrix, i.e. $sm_{ij}^{l|k}$.

II-V—The Semantic Importance Rank (SIR) of Partitions

Having calculated the importance ranks of the OSs of the composition by at least two methods now one can proceed to evaluate the Semantic Importance Ranks (SIR) of the OSs as follow:

$$SIR(OS_i^l \mid OS^k) = SIR_i^{l|k} = f_s(SCEN^{l|k}, CPN^{l|k}) \quad (12)$$

where $f_s$ is a predetermined function which in one general exemplary case can be given by:

$$f_s(x_1, x_2) = \alpha_1 x_1 + \alpha_2 x_2 + c \quad (13),$$

where $\alpha_1$ and $\alpha_2$ are preselected constantans with $|\alpha_1|$ and $|\alpha_2| \geq 0$, and c is an arbitrary constant. For convenience, and sake illustration only, one can select $\alpha_1 = \alpha_2 = \frac{1}{2}$ and c=0. However for computational efficiency for most of the application one can only use either SCEN or CPN value for ranking the OSs of the compositions. Depends on the application, computational power available, and the size of the composition and dimensions of the participation matrix $PM^{kl}$, i.e. N and M, etc., one can decide to calculate either SCEN or CPN or both for final ranking of OSs, i.e. evaluating SIR.

Figure 3:
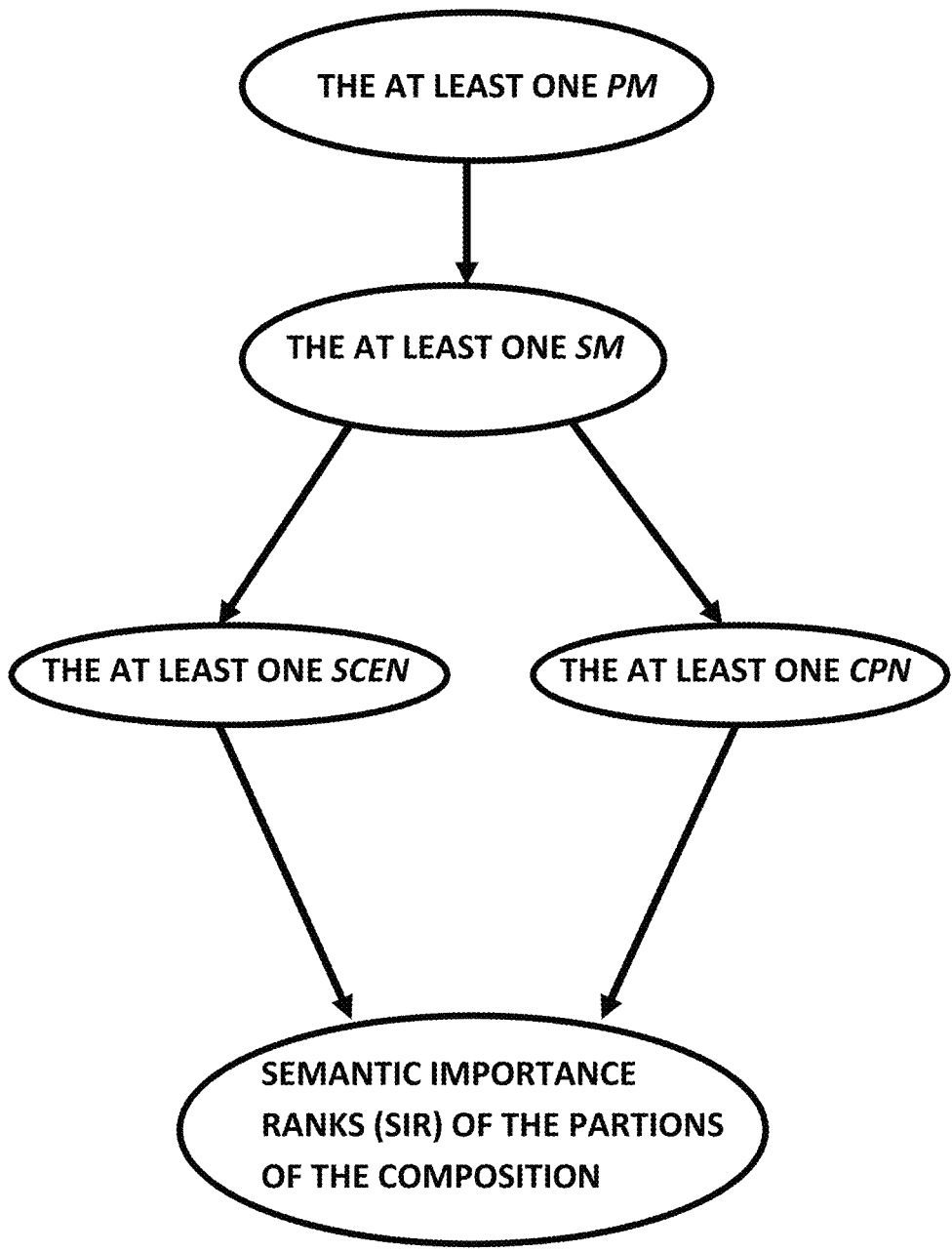
FIG. 3: shows a block diagram of calculating semantic importance ranks of ontological subjects employing both semantic coverage extent and centrality power concepts.

FIG. 3, shows the block diagram of the system and algorithm of calculating the Semantic Importance Ranks (SIR) of the partitions of a composition as expressed by Eq. (12). As seen from the input composition the participation matrixes are built and consequently the SCENs and CPNs are calculated from which the Semantic Importance Ranks (SIR) of the partitions are evaluated. The semantic importance ranks (SIR) can also be regarded as another significance aspect of a partition in a set of partitions of a composition.

Still more conveniently, (also for faster ranking evaluation of OSs), after evaluating the semantic importance rank of OSs of order l, from the participation information contained by $PM^{kl}$, one can proceed to evaluate the Semantic Importance Rank (SIR) of OSs of other orders, say OSs of the order l+r and $|r| \geq 0$, from the SIR of the OSs of the order l as the following:

$$SIR(OS^{l+r} \mid SIR^{l|k}) = SIR^{l+r(l|k)} = SIR^{l|k} \cdot PM^{l,l+r} \quad (14).$$

Figure 4:
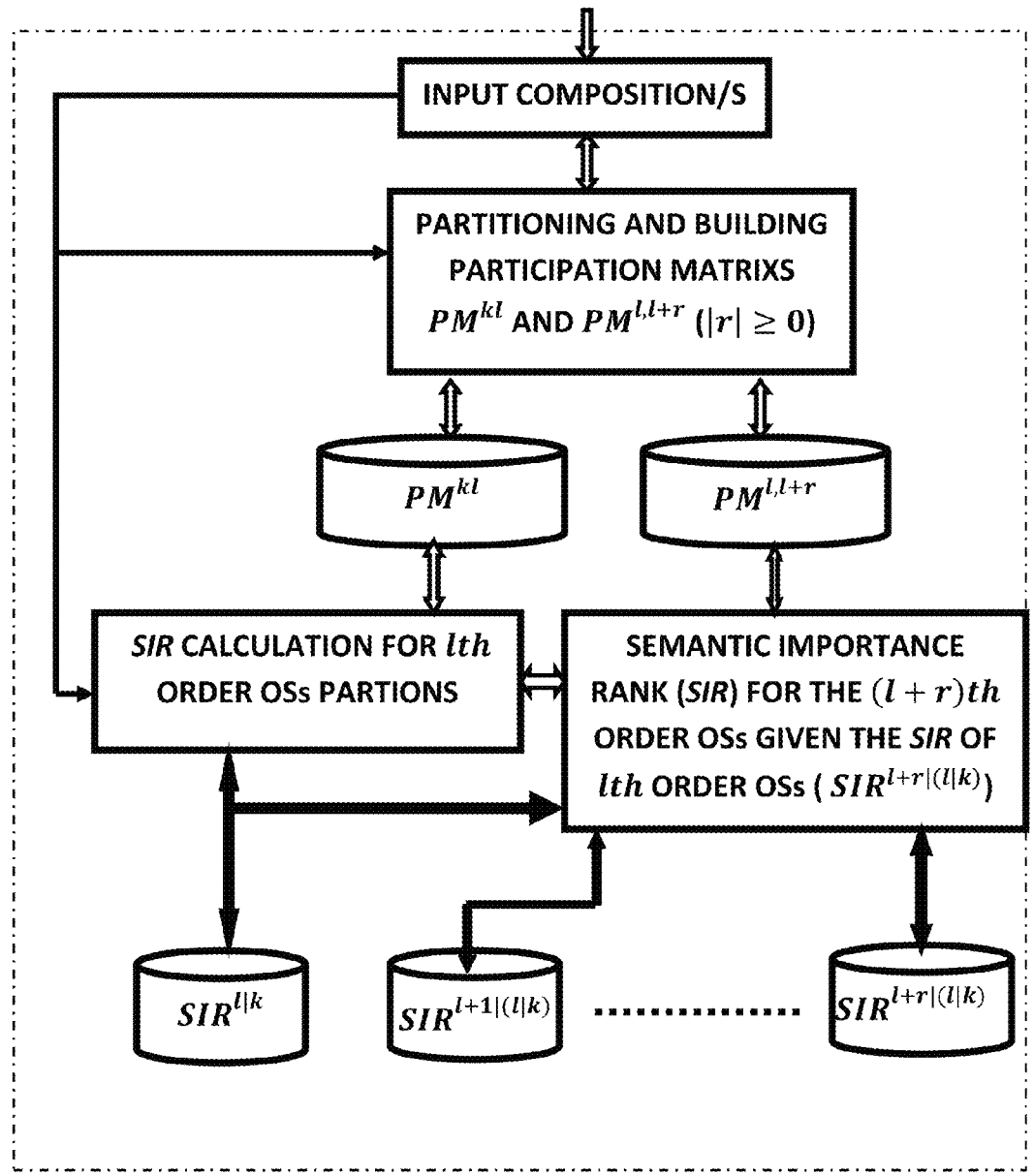
FIG. 4: schematic view of the system and method of building at least two participation matrixes and calculating SIR for lth order partition, $OS^l$, to calculate the Semantic Importance Ranks (SIR) of other partitions of the compositions and storing them for further use by the application servers.

FIG. 4, shows the block diagram of the algorithm and the system of calculating SIR values for different orders of OSs using SIR values of other OS. In this figure at least two participation matrices are built, say one for participation of kth order into lth order, i.e. $PM^{kl}$, and another lth order to (l+r)th order, i.e. $PM^{l(l+r)}$, and consequently the Semantic Importance Ranks of the lth order OSs is calculated from $PM^{kl}$ which is denoted by $SIR^{l/k}$ according to our notations in this invention. Having calculated $SIR^{l/k}$ and using the participation matrix of $PM^{l(l+r)}$ one can proceed to calculate the Semantic Importance Ranks of the (l+r)th order from the Eq. 14. Shown in the figure are databases that store and make it ready for information retrieval of SIR values of OSs of different order when needed by other parts of the application and services.

The implication of Eq. 14 is that when we assume that our composition is a group of webpages and we have scored the sentences of the composition using for instance the $PM^{12}$, then using Eq. 14 we can score the webpages only using the information of a participation matrix that shows which sentences have participated in which webpages (e.g. $PM^{25}$). The webpage that contains the most important sentences will score higher. Nevertheless, in this example other ways of evaluating a significance of webpage can be devised such as scoring based on density SIR value in a similar fashion explained for Eq. 9.

Figure 5:
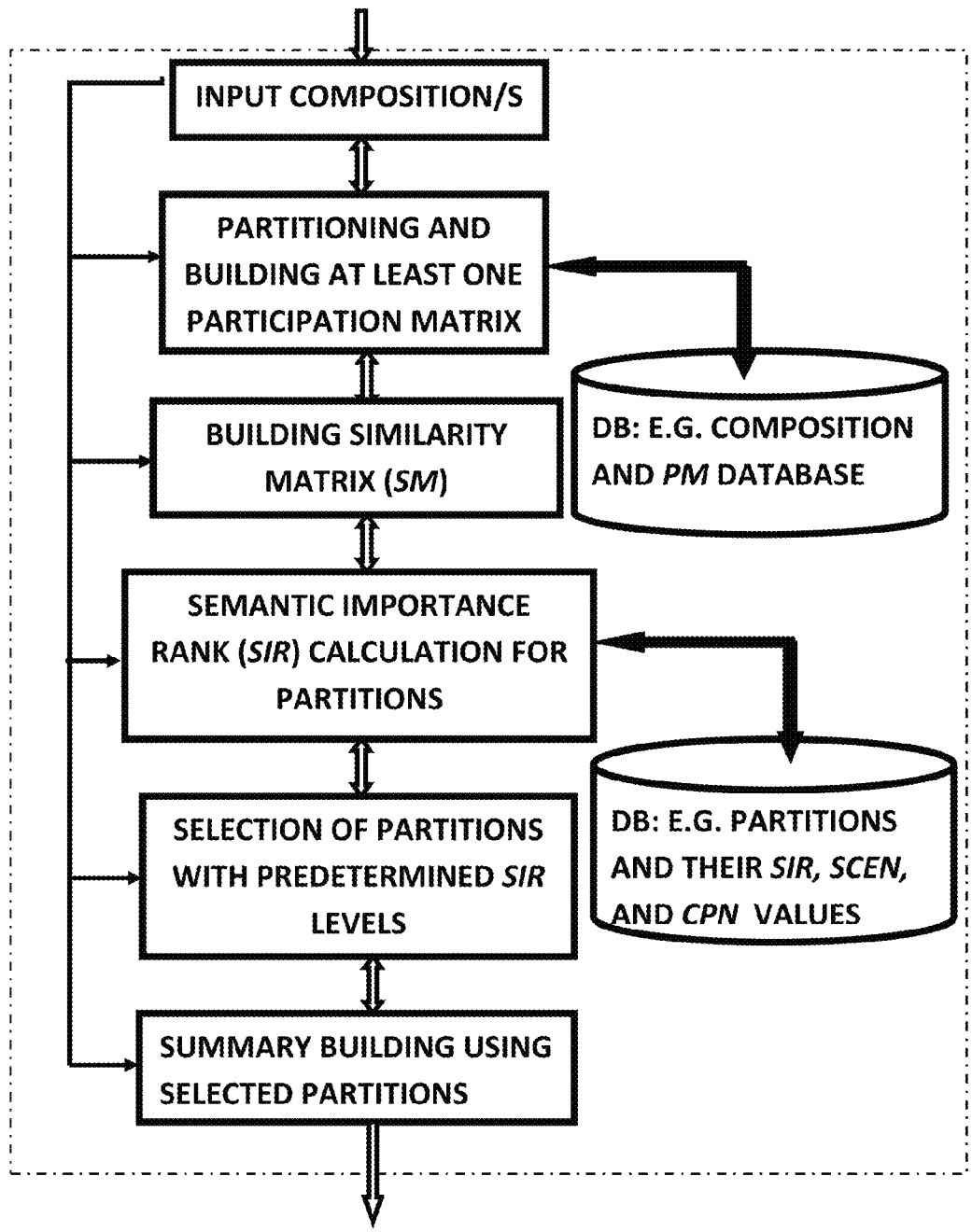
FIG. 5: is a flowchart of estimating Semantic Importance Ranks (SIR) of the partitions, i.e. OSs, of a composition following by an exemplary summarization application (which is the general application).

Referring to FIG. 5 now, it shows a block diagram of the general system, application, method and algorithm, of estimating the Semantic Importance Ranks (SIR) of partitions of an input composition, with application in summarization as described hereinabove and herein below.

Further explanation in reference to FIG. 5 is given by description of an exemplary, and also an important, case of summarization of a single text document in more details.

A composition, e.g. a single document, is entered to the system of FIG. 5. The system pars the composition, i.e. the document, into words and sentences, and builds the participation matrix showing the participation of each word into sentences. Then the system, using the algorithms, calculates the similarity matrix and calculates the SIR for each sentence. The summarizer then selects the desired number of the sentences (having the desired range of SIR) to represent to a user as the essence, or summary, of the input document. One might choose the different ranges or parts of the SIR for other intended applications.

Referring to FIG. 5 again, the input composition can be a collection of webpages or collection of documents which form a corpus. In this case the output summary is the summary, or distilled form of the corpus. Therefore with the system and method of FIG. 5, single or multi-document, corpus collection and the like, can be summarized, distilled, clustered, or selected as an answer to a question.

At the same time the method and the system can be employed for clustering partitions of the compositions, e.g. sentence in the above case, by simply grouping those partitions having almost the same SIR in the context of the given input composition.

Again in one particular and important case, consider the input composition to be a large number of documents and the preferred PM matrix is built for $PM^{1,5}$ (participation of words, k=1, to document, l=5), which is used to subsequently calculate $SCEN^{5|1}$, and/or $CPN^{5|1}$, and/or the $SIR^{5|1}$. The resulting SCEN, CPN, or SIR, can therefore be used to separate the documents having the highest merits (e.g. having top substance, most valuable statements, and/or well rounded) within this large collection of the document. In this exemplary case, the winner has the highest SIR, or highest density SIR, after a fair competition, for scoring higher SIRs, with many other documents contained in the collection. Shown in the FIG. 5 are the databases storing the compositions, participation matrixes, the partitions of the compositions, and the SCENs, CPNs and SIRs, of the partitions of the composition to be used by other applications, middleware, and/or application servers.

Figure 6A:
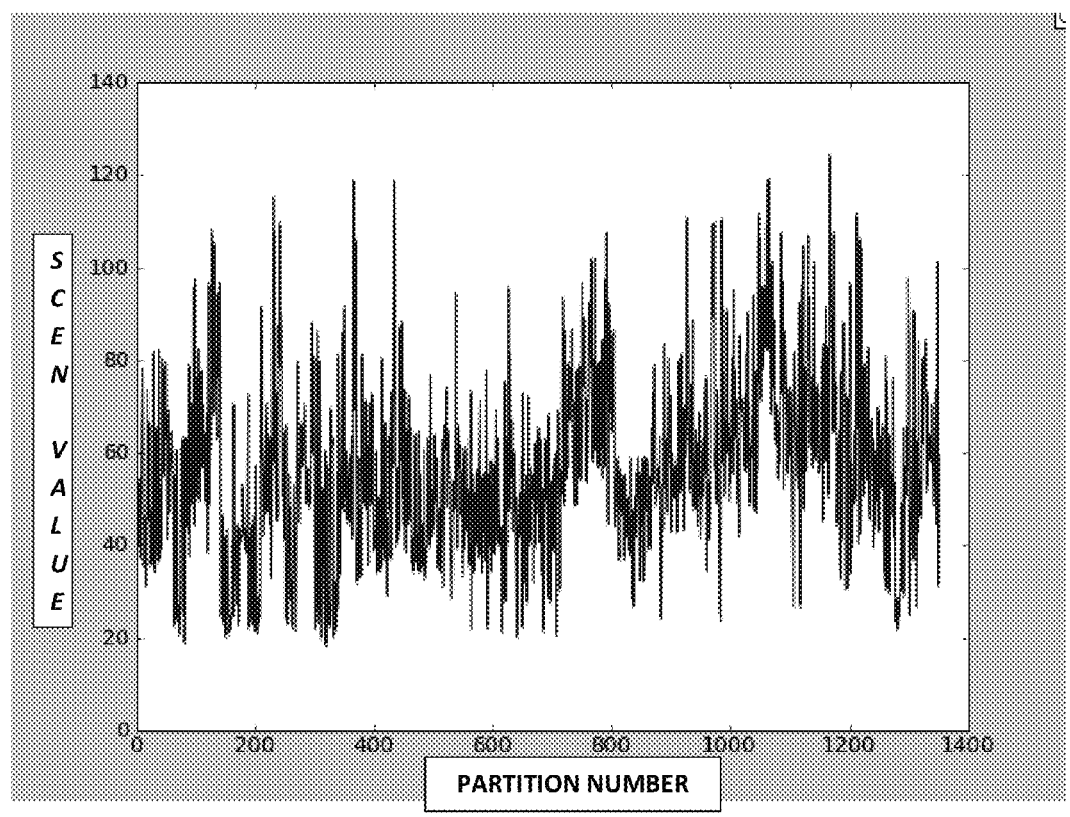
FIGS. 6A, B and C, show typical depictions representing, exemplary SCEN value versus the partition numbers, e.g. sentences, of a real corpus made of webpages, the partition number versus the ranked partition numbers, and the normalized SCEN value versus the ranked partition numbers, respectively.

FIG. 6A shows a typical and real exemplary case of calculating SIRs. In this particular instance only the SCEN was used in calculating the SIR. FIG. 6A shows the shape of figure of SIR value versus composition partitions' number. In this exemplary case, the composition was a corpus made of a collection of a number of webpages related to a keyword query returned by a search engine. The webpages were parsed and stripped off their codes and concatenated together to form a textual corpus. Consequently the corpus was parsed to its constituent words (as the lower order OS, i.e. k=1) and to sentences (as the higher order OS or the partitions, i.e. l=2). A PM was built using a number of words and a number of sentences (for shorter processing time) followed by calculating the SCEN for the sentences.

Figure 6B:
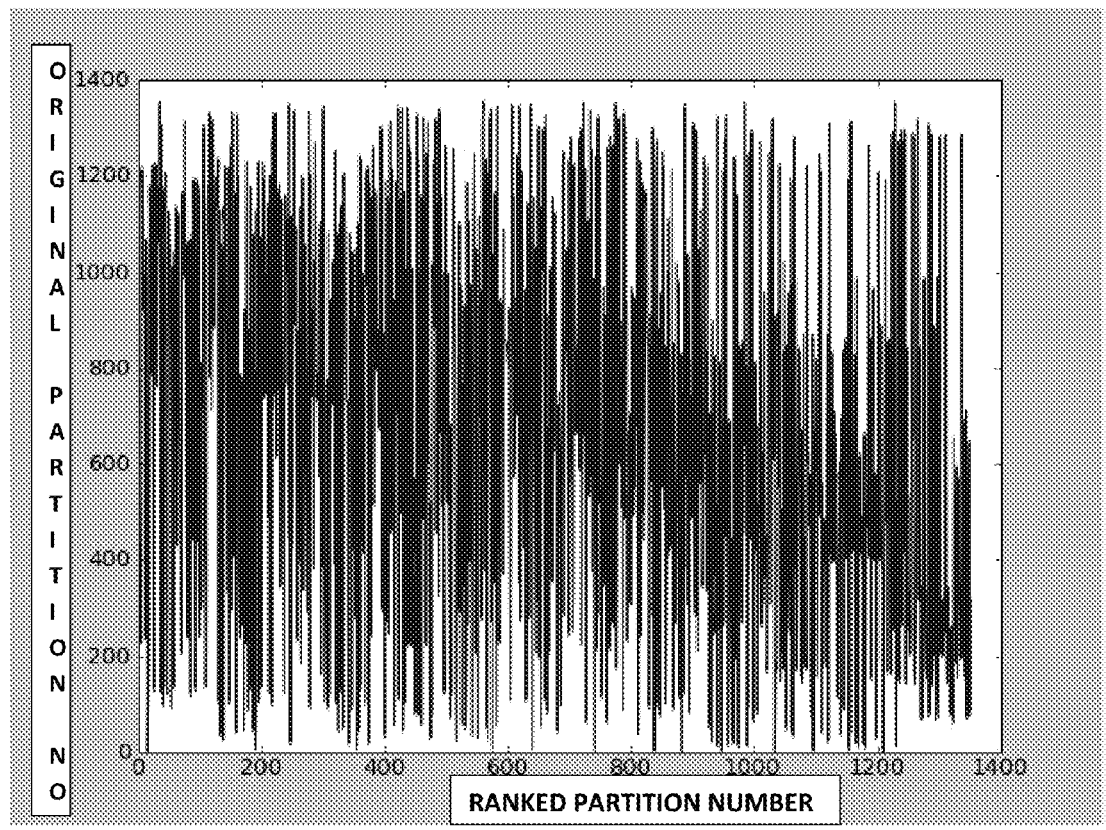
In FIG. 6C possible exemplary applications and interpretation of different ranges of SCEN are also depicted.

The system and method of FIG. 5 produced the SCEN values of the sentences and the partitions were ranked based on their SCEN (the partition with the highest SCEN ranked first). FIG. 6B shows the before ranking partition number versus the ranked partitions' number. As seen the sentences are reordered quiet frequently which is expected given that not all the sentences are emphasized equally in the corpus.

Figure 6C:
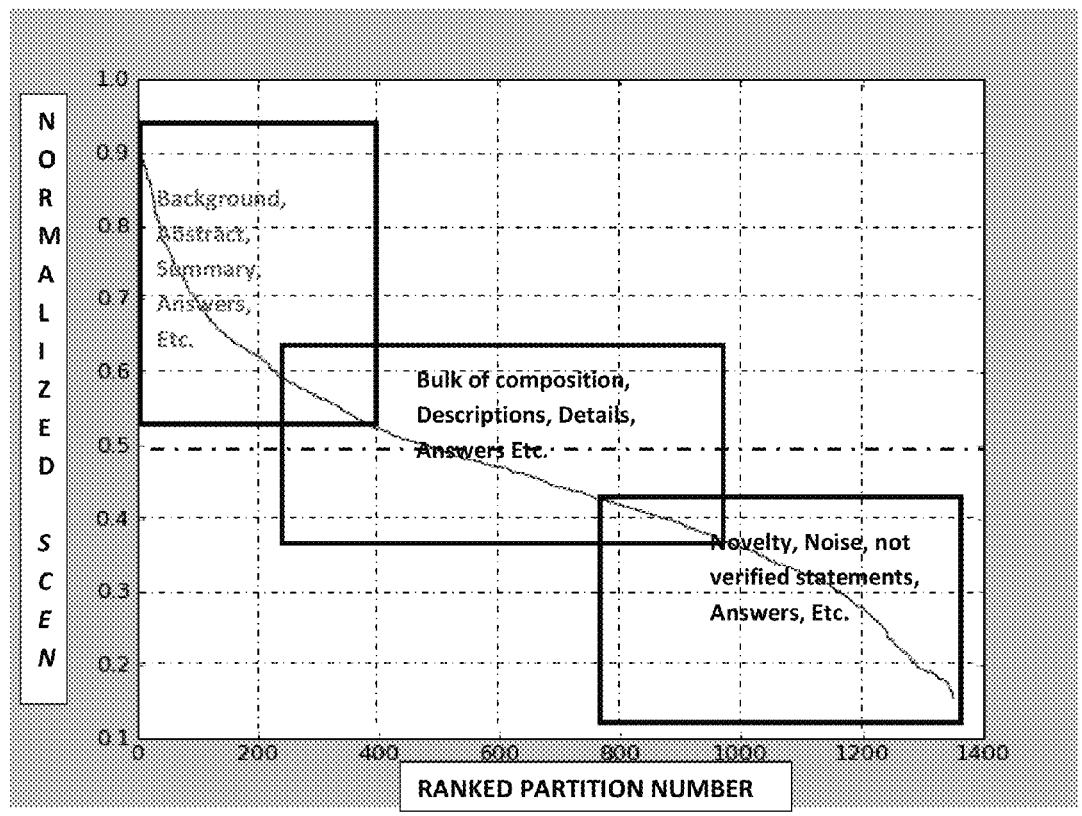

FIG. 6C shows the normalized SCEN values of the sentences versus the ranked partitions' number. As seen and expected again, the graph is a declining curve starts from the highest SCEN value corresponding to the first ranked sentence and decline toward the last ranked sentences with the lowest SCEN. The important observation and interpretation is that different parts of the SCEN graph versus the ranked sentence number can be used for different desired applications. As shown, for instance, the sentences with the highest SCEN maybe selected as the summary or abstract of the corpus while the middle section contains the sentences that most probably are more descriptive and specific than the higher SCEN area and can be selected for applications needing more detailed information about something (something can be the input query to the system of a corresponding client server application). The areas with the lowest SCEN value, most probably, containing novel and less known information. This part most probably contains the statements that are less well known and less obvious but could be very important. So this area can be looked for novelty detection or further investigation and knowledge discovery. However, this area also may very well contains the irrelevant or noisy (e.g. nonsense) sentences.

In one particular case, assume the composition is a collection of separate documents or webpages, and the composition has been parsed to words and sentences, participation matrix of words into sentences has been built, and the SCENs have been calculated for sentences. Now in order to evaluate the SCEN for the documents we should build another participation matrix, say PM2, for participation of sentences to documents. However it is very unlikely to have identical sentences in different documents so that each row of the PM has only one nonzero element. In other words the PM2 becomes very sparse and the similarity measures become less meaningful. In this case one, one may use the similarity matrix derived from the first PM, ie. words to sentence participation, to cluster all those OSs having a high similarity value, e.g. 80% or more, and form a synonym set for sentences of each cluster and replace the all the sentences of each synonym set with one OS and consolidate the PM so that in each row we can have more than one nonzero element. In other words we form a synonym set for OSs having high similarity measure and replace all the members of each synonym set with the OS of the set having the desired, e.g. the highest, similarity values. However in general each synonym set can be represented with any symbolic OS without any constrain. That will also decrease the processing time.

Figure 7:
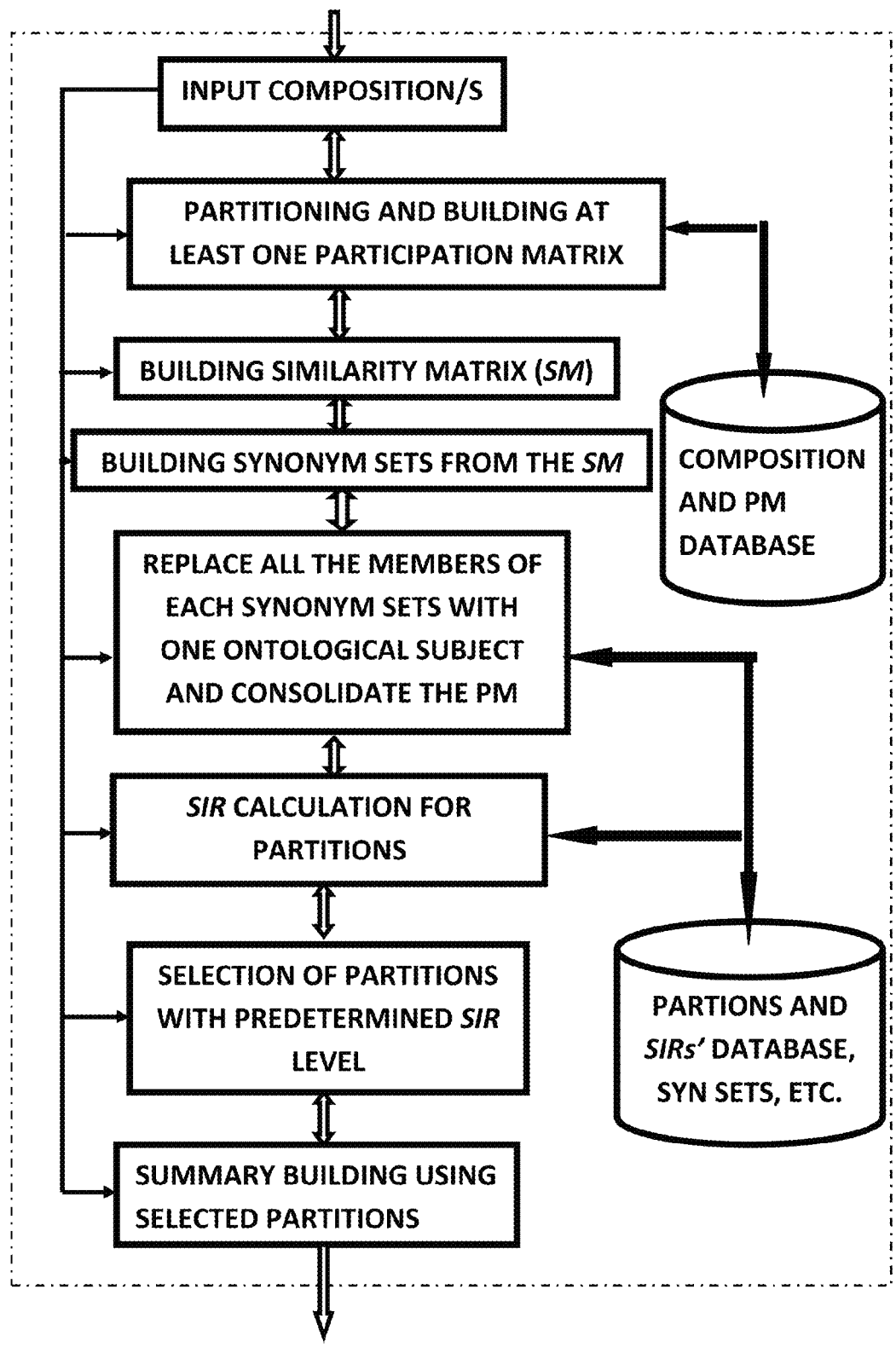
FIG. 7: another exemplary flow diagram of ranking by calculating. SIR and the summarization process according to one embodiment of the invention in which all the members of each OS synonym set replaced with a single OS.

FIG. 7 shows the exemplary flow diagram of ranking by calculating SCEN and the summarization process according to this embodiment in which synonym sets of OSs are identified from the similarity matrix and all the members of each OS synonym set replaced with a single OS.

Specifically, the words can be replaced with their synonym obtained from a dictionary. For instance one can form a number of synonym sets for a number of groups of words, having almost similar meaning, and replace the words belonging to the same synonym set by a unique symbol or one of the members of the synonym set. In this way semantic similarity measure of partitions becomes more pronounced. The said one of the members of the synonym set can be the most popular member of the set in an average dictionary of the language of choice. Advantageously in this way the processing time by computers decreases significantly, when there are less symbols and words, i.e. lower order OSs, in the composition and the resulting participation matrixes.

Identifying the most important partitions is very important and has many applications in summarization, distillation and question answering. When a composition is partitioned to constituent sentences, then the present invention system and method yield the most valued sentences and statement that can be recomposed automatically to form a distillation of a corpus or multi-document summaries. Also since in this method the system identifies the sentence that are in essence repeated formally or semantically many times along the corpus and therefore they are valid and can be regarded as a true statement and when organized in order they can be used as an answer to an inquiry thereby forming a question answering system with verified statement of the facts which is presented to a user, i.e. client, as service.

In another exemplary embodiment, as an alternative to semantic synonym sets, one can form a non-binary participation matrix $PM^{kl}$ whose enteris can have value of $[0, 1]$ interval, and can be given by, for instance, the followings:

$$pm_{i,j}^{kl} = \begin{cases} pm_{i,j}^{kl} = 1 & \text{if } OS_i^k \in OS_j^l \\ pm_{p,j}^{kl} = \max(sm_{q,p}^{k|:}) & \text{if } OS_p^k \notin OS_j^l \text{ but all } OS_q^k \in OS_j^l. \end{cases} \quad (15)$$

The resulting PM form Eq. (15) then can be used to build the similarity matrix of OSs of order l in the Eq. (3) using similarity measure such as Eqs. (5), (6) and (7) or any other appropriate similarity measure equation for this case, and consequently proceed with estimating SCEN value using Eq. (8) or (9), or CPN and SIR. The Participation Matrix of Eq. (15) can also be dealt with as partial participation matrix and one may desire to use the concepts of Fuzzy membership, Fuzzy set theories, and generally Fuzzy arithmetic to estimate the SIR, and other desired parameters of interest.

Many small variations in the method can be done without the departure from the scope and the sprit of what has been disclosed here.

Figure 8:
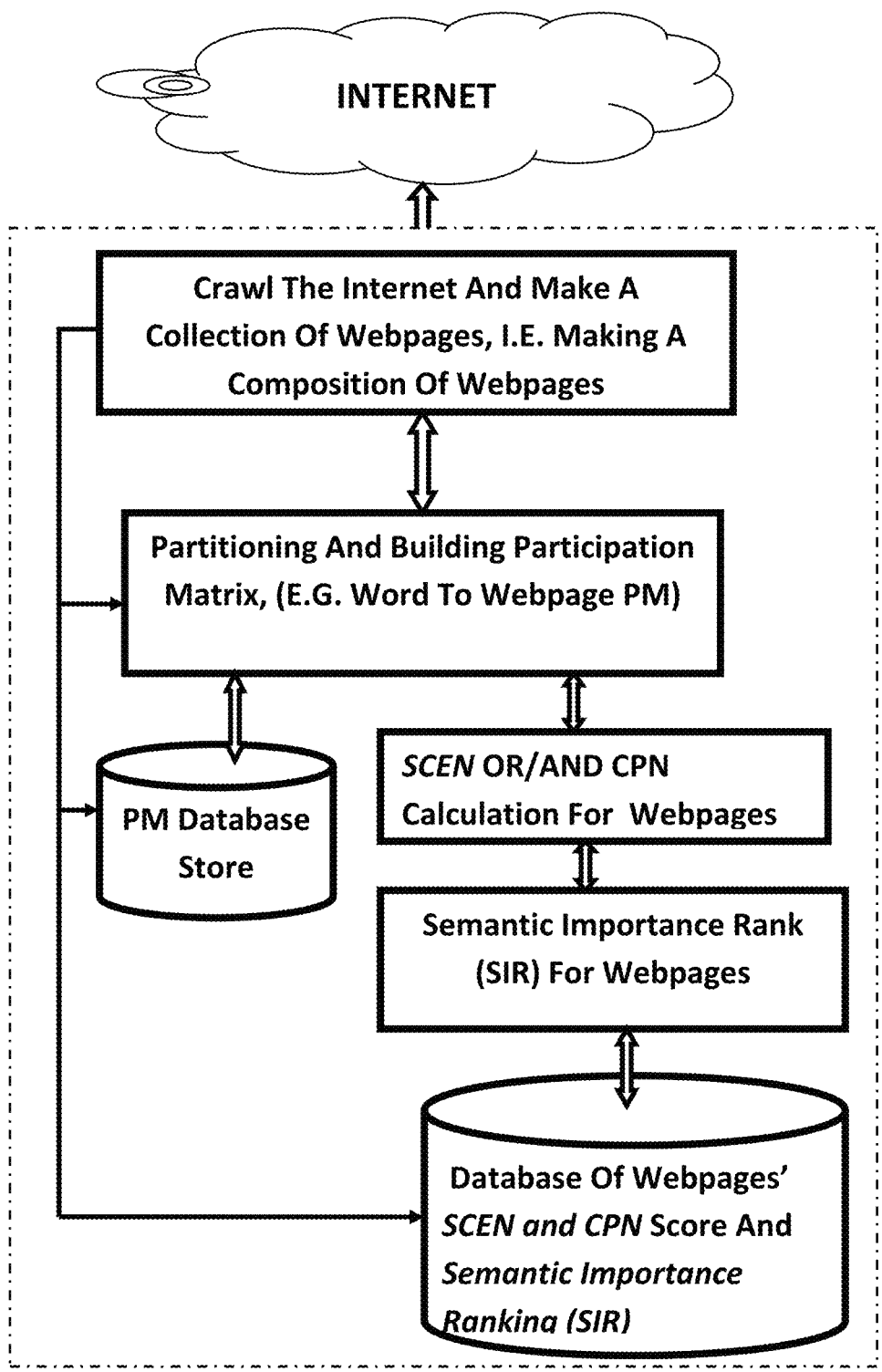
FIG. 8: a block diagram of an exemplary application and the associated system for ranking and storing the crawled webpages from the internet using Semantic Importance Rank (SIR).

Referring to FIG. 8 now, it is to demonstrate another important exemplary application. FIG. 8 employs the method and the system for ranking and retrieval of document and webpages for using as a search engine. In this embodiment the crawlers will crawl the web and gather as many webpages as it can from the internet. The whole collection can be regarded as a composition (can be called e.g. the internet composition) which will be broken to the constituent webpages and the constituent words and phrases of the webpages. Then construct the PM for the collection of the webpages. In the preferred embodiment using this method the lower OS is the words and phrases and the higher order OS is the web page itself. Calculating the SIR (e.g. only using SCEN for faster calculation) for each webpage then can rank all the webpages based on their real intrinsic value and substance.

As seen in FIG. 8, the system crawl the internet and make a collection of webpages, then proceed with partitioning, parsing and building the participation matrix of constituent lower order OSs participation to higher order OSs of the internet composition.

All the information such as the composition, partitions, and all the other components may be stored in databases for use by the search engine. Particularly the at least one participation matrix is advantageously stored since it contain the most important information.

Figure 9:
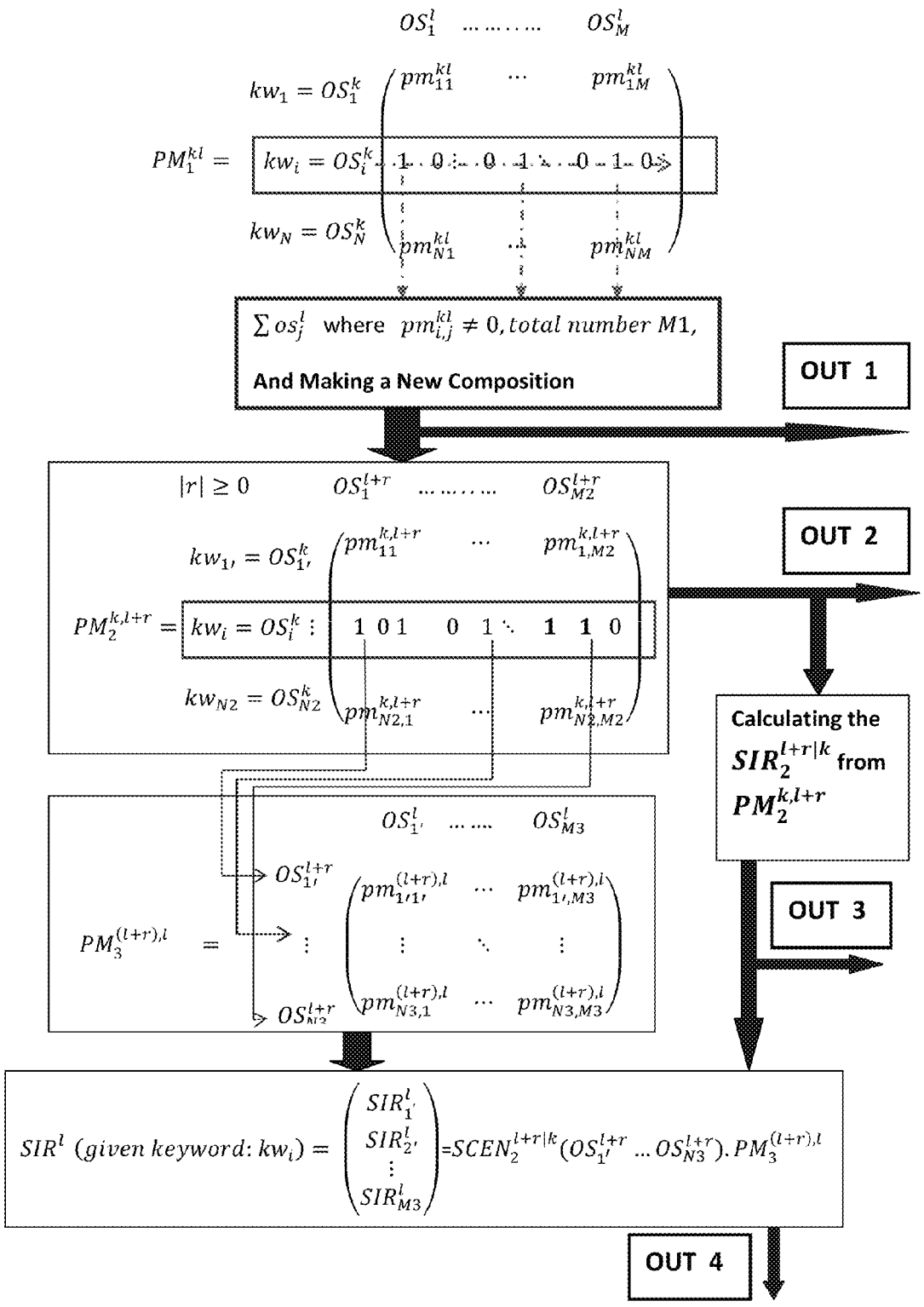
FIG. 9: shows the flow diagram and flow process of a system that produces, employing the PMs and the semantic ranking algorithms, several outputs related to an input keyword.

In FIG. 9 the uses of the stored information of the participation matrixes are demonstrated in an exemplary integrated question answering system that serves a user the right information about her/his query in the form of the most appropriate answer. The answer could be a webpage, a document, a paragraph, a sentence or a statement, or any partitions of the composition that conveys the most appropriate information about the query.

Let's explain FIG. 9 in detail by focusing on an exemplary but familiar service of search engine that return the most appropriate webpages as an answer to user request for information about an exemplary keyword (shown as $kw_i$ in FIG. 9) while at the same time can also provide an answer to the query in other forms such as the best statements, e.g. sentences, the best paragraphs, or the best partitions of the internet composition related to the query. Now suppose this search engine have built a first participation matrix, say $PM_1^{k,l}$, of words (e.g. keywords) into webpages (e.g. lets also say k=1, as the keywords OS order, and l=4 as the webpages OS order). When a user query the system for related information, the search engine can comb out all the webpages that contains the keyword, all M1 number of $OS_i^l$ for which the $pm_{i,j}^{kl} \neq 0$, and present it back to the user as the answer to the user query, the OUT 1 in FIG. 9. However it might be more desirable to rank this new set of webpages, containing the keywords, more accurately. In this case one can evaluate the SIR, (or only the SCEN for simplicity) for this new set of webpages (i.e. all M1 number of $OS_i^l$ for which the $pm_{i,j}^{kl} \neq 0$) by making a new composition from this set and building the desired PM/s. However it might be more desirable to rank this new set of webpages, containing the keywords, even more accurately.

For more accuracy the system can build at least one the second participation matrix, denoted by $PM_2^{k,l+r}$ in FIG. 9, using words and smaller partitions of a webpage such as paragraphs or sentences, (denoted by $OS_1^{l+r}$ when r<0), and evaluate the SCEN for the sentences or paragraphs. The search engine system at this stage can return a set of smaller partitions, containing the keyword, as the answer to the user query, OUT 2, or the ranked set, based on the SCEN, of smaller partition as the answer, OUT 3. The search engine can also return the ranked most appropriate webpages, or webpage based on the SCENs of their partitions, i.e. $SCEN_2^{l+r|k}$, and the information of yet another participation matrix, e.g. $PM_3^{(l+r),l}$. As seen in FIG. 9 the third PM, is build from the participation of the combed out partitions, from the $PM_2^{k,l+r}$, containing the keyword, into the webpages $OS_1^l$. Consequently calculating the Semantic Importance Rank of the webpages, related to the query keyword, the system can return the most appropriate webpages to the users, OUT 4 in the FIG. 9.

The advantage of such exemplary integrated answering system is that for the given query different answers can be provided to the user at the same time. The ranked sentence answers are not necessarily listed in the order of the list of the webpages that contains those sentences. For instance, a sentence level answer to the query, e.g. OUT 2 or OUT 3 in FIG. 9, is independent of the webpage rank. However the rank of the higher order OSs, e.g. the webpages, are more dependent on the semantic ranks of the lower order OSs which results in a ranking method that is based on the intrinsic value of the contents of the webpage. Also each answer is independently qualified in comparison to a large group of possible answer having the same OS order. In this way the answer is more based on the intrinsic value of the answer in relation to the keyword rather than Alternatively or additionally one can, yet, combs out the smaller partitions of the set of webpages containing the keyword, (e.g. the sentences, or paragraphs, containing the keywords) and calculate their SCEN number. And from the PM of sentence to webpage then rank the webpages related to the keyword more accurately and more appropriately.

Figure 10:
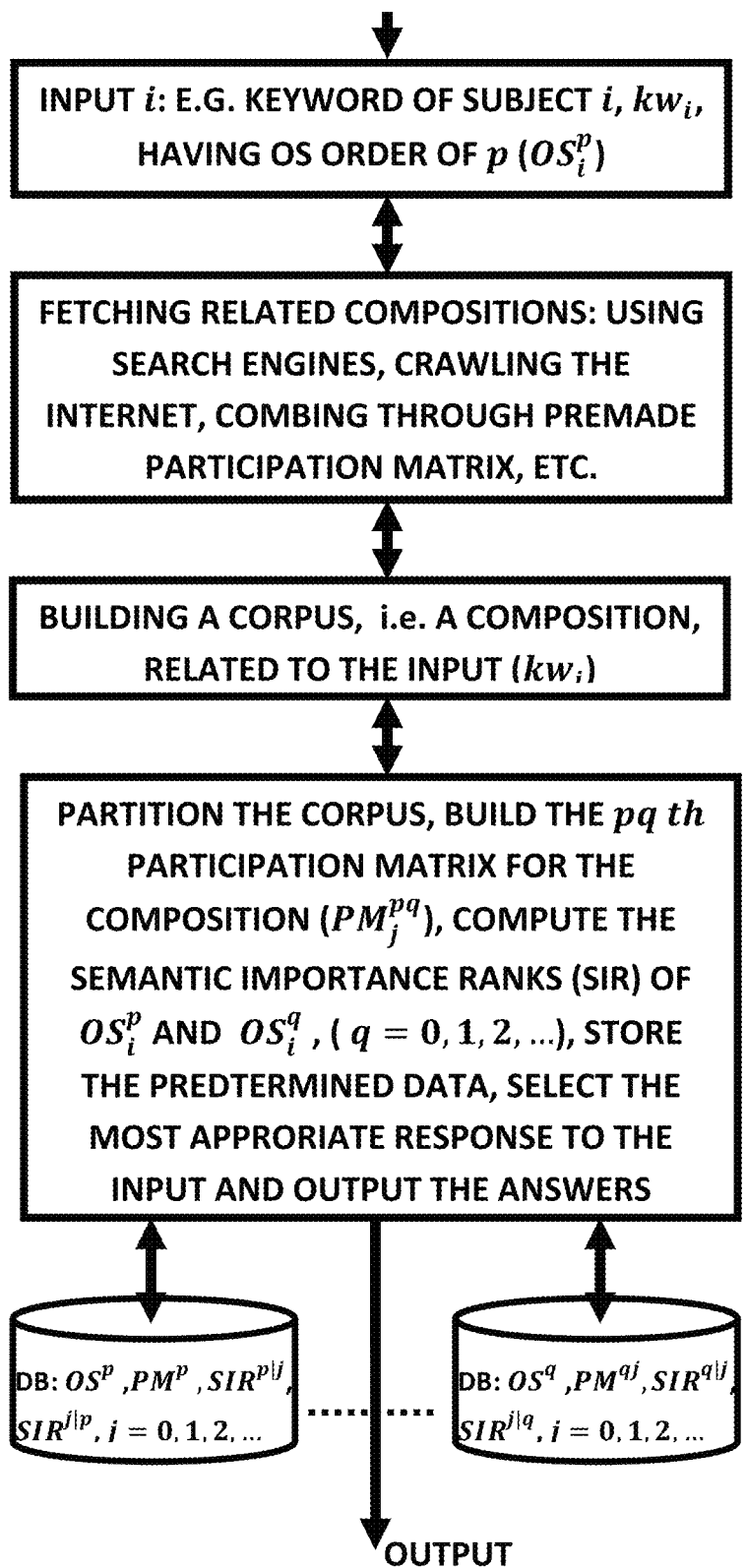
FIG. 10: shows the block diagram of an exemplary query/answer system which computes and store Semantic Importance Ranks of Ontological subjects of different orders along with all other desired data.

Referring to FIG. 10 now, this shows an exemplary block diagram of a system of question answering having the executable computer code for implementation of the algorithm of FIG. 9. One or several computer and computer servers maybe employed to execute and implement the algorithm of FIG. 9. The output in FIG. 10 is at least one of the outputs of FIG. 9. A keyword is entered to the system and the system fetch the related compositions of different levels for the input keyword having an OS order of p ($OS_i^p$), make a composition for that keyword, or key OS, using the composition the system proceed with building the participation matrix and calculating all the desired parameters such as SCEN and CPN and SIR of the partitions or OSs of different orders, and depends on the predesigned service provide appropriate outputs as the response to the query or keyword. Meanwhile the system can store the information in the databases as shown in FIG. 10 to be used for later use. The system can be devised to automatically perform the same for whole lists of keywords, or key OSs offline to make premade databases to be used later by other application programs or services.

Figure 11:
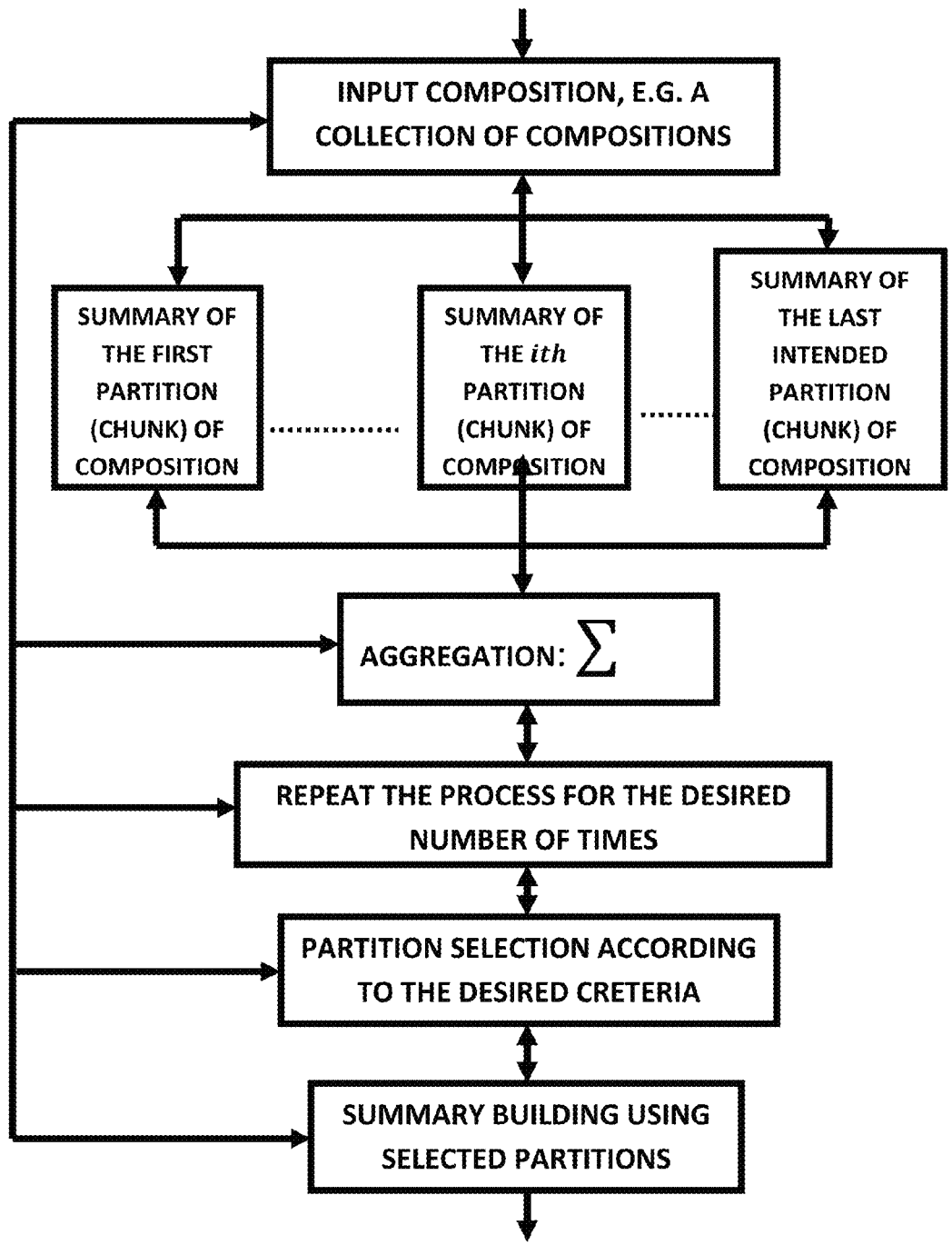
FIG. 11: shows the block diagram of another exemplary application and the system for summarization/distillation of a corpus employing the summarization in several stages.

Referring To FIG. 11: shows another exemplary application and embodiment in which summarization is done at multiple stage. As seen a composition, e.g. a large corpus, is broken to a number of partitions, and summarization is done on each partition, then summary of some of the partitions are integrated together to form a new composition and the summarization is done for this new composition. This embodiment is particularly good for large corpus in which the computational complexity become an issue or the corpus is clustered and in each cluster there can be found many similar partitions or OSs, e.g. similar documents, similar sentences etc. In this embodiment at each stage it may become advantageous to use different method and measure of semantic importance. For example for the first one or more stages one may use the SCEN only and for the later stages use the CPN or in general any desirable combination of SCEN and CPN, at each stage.

Figure 12:
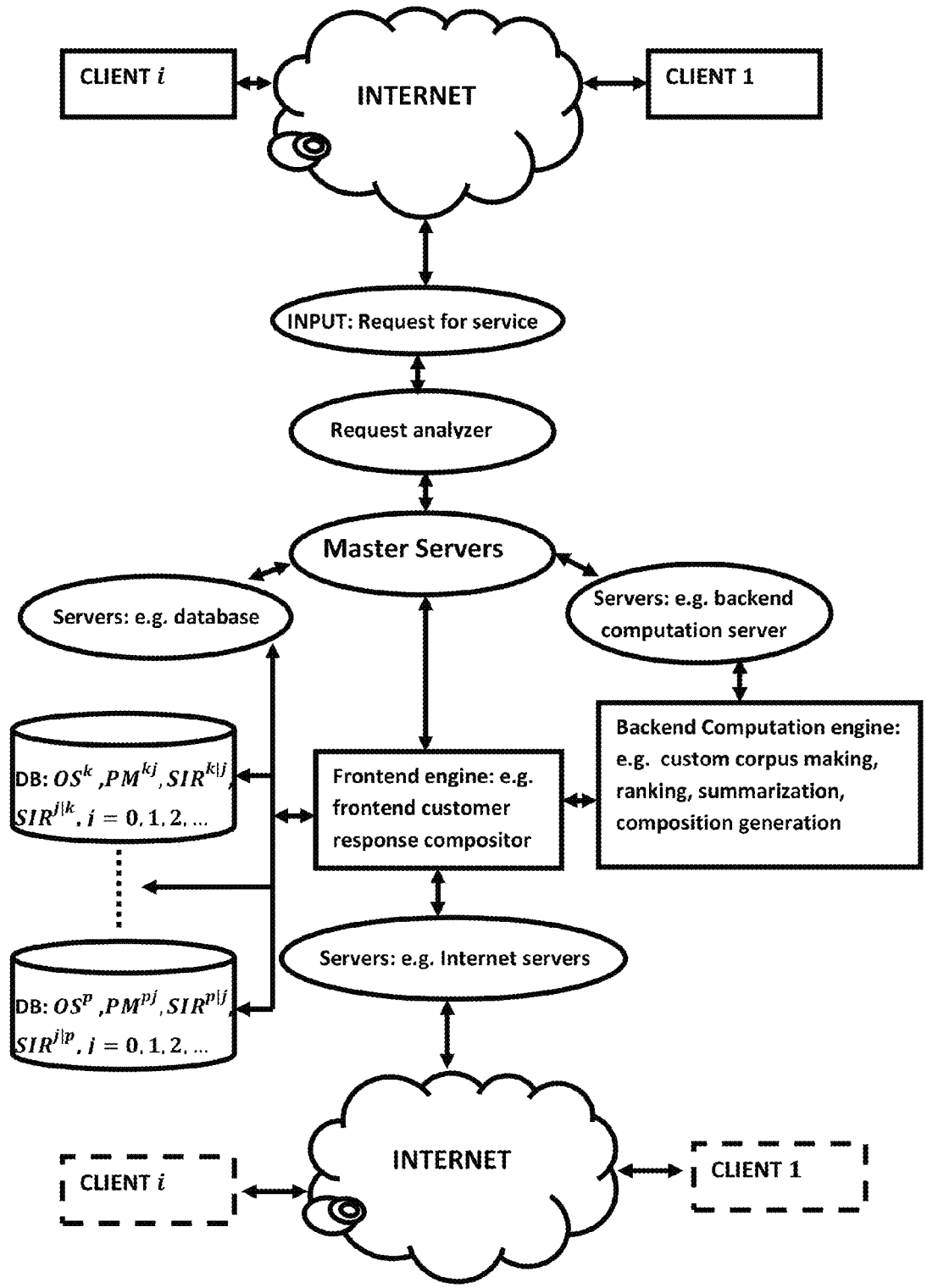
FIG. 12: shows an exemplary client server type system to fulfill requests of users for services such as composition analysis, summarization, document ranking and comparison, web searching engine, search priority and research trajectory guidance, distilled knowledge answering, new document composition, etc.

Referring to FIG. 12 shows an exemplary system of client and server application through internet. As shown the system receives a request for service in the predetermined formats such as a keyword, a natural language question, request for summarization, request for list of ranked documents or webpages, or all other type of application that some are listed here. The system consists of hardware and software programs needed to process the request of clients, such as computer servers and software packages for serving the client in the frontend or working for the client request at the backend engine and fulfill the client request. There is a request analyzer which analyze the request and decide where and which one of the servers are best suited to fulfill the request. The system may also has access to premade databases such as the databases shown in FIG. 10. After processing the client request the system compose the response to the client's request and send it back to the client through internet or any other means of communication or any device and apparatuses suitable to serve the client's request.

Applications:

Few exemplary applications of the method and the system disclosed here are listed here, which are intended for further emphasize and illustration only and not meant neither as an exhaustive application list nor as being restricted to these applications only.

1. Clustering of compositions or their partitions: one of the applications is clustering of compositions having a predetermined level of similarity measure obtained from the information of similarity matrix as well as their SCEN and SIR values. For example after building the similarity matrix for the partitions of the composition or a corpus, for each partition $OS_i^1$, looking at the corresponding row of the SM, i.e. the ith row, and finding those $OS_j^1$ for which the $sm_{ij}^1$ has the higher than a threshold value and cluster them as a set of highly similar partitions or compositions.
2. Composition ranking: another obvious application is ranking of compositions among a collection of compositions to be used in search engines, information and document retrieval, optimum database storing etc.
3. Summarizations: selecting a number of OSs of a desired order, having a desired range of SIR, from the set of partitions of a composition, a corpus, or a collection, as the summary representation of the composition, corpus, or the collection.
4. Distillations: finding the essence of corpus or a collection of compositions by one or more stages of summarization. Especially when the participation matrix is consolidated by replacing sets of synonym OSs with one common OSs.
5. Novelty detection: using the SCEN or CPN and the SIR to spot a novelty depends on the levels of the ranking parameters corresponding to the partitions of the composition.
6. Main bulk detection of corpuses or compositions: selecting a number of OSs, i.e. the partitions of the composition, having predetermined semantic importance ranks, e.g. average SCENs, for representing the bulk or main body of a corpus or a clustered group of composition related to topic etc.
7. Background information of corpus: selecting a number of OSs, i.e. the partitions of the composition, having predetermined semantic importance ranks, e.g. the highest SCENs, for representing the verified facts and basic background of a corpus or a clustered group of composition related to a topic etc.
8. Automatic Document composition: selecting a number of OSs having a predetermined spectrum, e.g. highest, average, lowest SCEN or semantic importance ranks, for representation and to compose a new document representing the whole corpus covering the desired aspects, (e.g. novel, bulk, background or any combination) of a corpus or a clustered group of composition related to a topic etc.

9. Verified true statements: assuming one have a corpus or a collection of document as the initial composition which is broken to partitions such as words and sentences or statements, then clustering the partitions based on containing one or more keywords, then those partitions or statements that have the highest SCEN can be considered as the true statements expressing facts or true statements related to those keywords contained in the partitions. The true statements corresponding to the keywords may further be stored in databases as premade repositories.

10. Question answering: having stored the true statements about one or more keywords, then a question answering engine system can use these statements as the answers to the questions containing the keywords used in the corresponding true statements that have been stored in the databases.

11. Document comparison: using the ranking method disclosed in here one can cluster the documents and further ranks the partitions therein and identifies the partitions as novel, true background, and descriptive, one then can characterize the documents in comparisons to large collection of documents or to each other as being, for instance, novel or descriptive etc.

12. Ontology database building: in a similar fashion to finding the verified true statements related to keywords one can build databases as repositories of knowledge about entities or subject matters as well as their relations.

13. DNA sequence interpretation: considering a DNA sequence as a composition, and breaking this composition to OSs of desired orders in order to look for patterns and locations of DNA pieces having a predetermined semantic importance range. The method and the associated system in the form of computer hardware and programs can be used for gene detection, genome summarization, gene ranking, junk DNA detection, genetic modification, etc.

14. Signal processing: using any form of symbols for representation of physical signals one can make a composition and rank the OSs of the composition for using in different application and processing of the signal. The method can be used for processing audio and video signals for feature extraction, recognition, pattern recognition, summarizations, compression, conversion from one form to another form of signal etc.

15. New essay or composition generation: new compositions or well written essay can be generated using the generated databases for the listed applications and using the association of the OSs.

16. Mapping OSs of different nature to each other: databases of OSs of different nature, e.g. text and video signal, having similar semantic and syntactic functions can be stored and converted to each other. For example one can build equivalent compositions from text and video signals which can convey the same semantic message.

In summary, the invention provides a unified and integrated method and systems for evaluating the semantic importance of compositions and their partitions among a set of compositions. More importantly the method is language independent and grammar free. The method is not based on the semantic and syntactic roles of symbols, words, or in general the syntactic role of the ontological subjects of the composition. This will make the method very process efficient, applicable to all types of compositions and languages, and very effective in finding valuable pieces of knowledge embodied in the compositions.

The system and method have numerous applications in knowledge discovery and finding the best piece of knowledge, related to a request for knowledge, from one or more compositions. The invention can serve knowledge seekers, knowledge creators, inventors, discoverer, as well as general public to obtain high quality contents related to their working subjects. The method and system, thereby, is instrumental in increasing the speed and efficiency of knowledge retrieval, discovery, creation, learning, and problem solving to name a few.

It is understood that the preferred or exemplary embodiments and examples described herein are given to illustrate the principles of the invention and should not be construed as limiting its scope. Various modifications to the specific embodiments could be introduced by those skilled in the art without departing from the scope and spirit of the invention as set forth in the following claims.

What is claimed is:

1. A unified method of scoring partitions of a composition of ontological subjects comprising:
    obtaining at least one set of ontological subject of a first predefined order;
    partitioning the composition of ontological subjects into one or more pluralities of partitions;
        constructing one or more data arrays corresponding to at least one participation matrix representing participation pattern of at least some of said ontological subjects of the first predefined order into one or more of said partitions by having a non-zero value in the corresponding entries of the participation matrix, wherein each row of the participation matrix is representative of one of said ontological subjects and each column of the participation matrix is representative of one of said partitions or vice versa;
        assigning or calculating scores, according to one or more importance aspects of one or more predefined criteria of importance, to one or more of said ontological subjects of the first predefined order;
        scoring one or more of said partitions of the composition, by using the score of the ontological subjects of the first predefined order and data of one or more of said one or more data arrays corresponding to said at least one participation matrix; and
    processing said scoring data of partitions and/or storing said scoring data of partitions onto one or more non-transitory computer readable storage.

2. The method of claim 1, wherein the method is performed by at least one computer program comprises computer programming codes, stored in one or more non-transitory computer-readable storage medium and executable by at least one processor.

3. The method of claim 1, further comprising storing one or more of the followings in a non-transitory computer-readable storage or memory:
    at least one of said partitions;
    at least one of said ontological subjects;
    at least one participation pattern representing participation of at least some of said ontological subjects of the first order into some of said partitions;
    at least one of said partitions whose score is higher than a predefined value.

4. The method of claim 1, wherein one or more of said partitions are selected and composed together in a predetermined format to represent a summary of the composition.

5. The method of claim 1, wherein said set of ontological subject of the first predefined order is extracted from the composition.

6. The method of claim 1, wherein said composition is a genetic code corresponding to one or more deoxyribonucleic acid molecule.

7. The method of claim 1, wherein said composition is a genetic code, said genetic code have symbols representing at least one of chemical bases of adenine, thymine, guanine, cytosine, and uracil.

8. The method of claim 1, wherein said composition is represented by electrical signals.

9. The method of claim 1, wherein said composition is represented by a digital signal string having ones and zeros.

10. The method of claim 1, wherein said composition contains textual content, wherein said set of ontological subjects of the first predefined order is among one of: a plurality of words, a plurality of sentences, a plurality of paragraphs, and a plurality of pages that were used in the composition, and said partitions are sentences, paragraphs, pages, and documents of the composition.

11. The method of claim 1, wherein said composition contains a set of documents or webpages.

12. The method of claim 11, wherein said partitions are the documents or the webpages.

13. The method of claim 1, wherein data of said one or more data arrays corresponding to said one or more participation matrices is used for calculating similarities between a plurality of pairs of partitions and scoring one or more of the partitions, comprising:
  calculating a plurality of similarity coefficients according to at least one predetermined similarity measure between one or more pairs of said partitions of the composition,
  scoring said one or more partitions based on at least one predefined function wherein at least one of variables of said at least one function is from the plurality of similarity coefficients.

14. The method of claim 13, wherein said at least one predefined function includes a function, or a mathematically equivalent operation, that aggregates values of one or more number of the similarity coefficients.

15. The method of claim 13, wherein the scores of the one or more partitions are based on centrality values of partitions in a graph corresponding to the composition, comprising:
  constructing at least one data array corresponding to at least one similarity matrix representing the plurality of similarity coefficients of the partitions;
  using said similarity matrix to build a graph showing connections between the partitions, wherein the partitions are nodes of the graph and edges of the graph show association of nodes based on the similarity between the connected nodes;
  scoring the one or more partitions based on centrality values of their corresponding nodes in the graph.

16. The method of claim 15, wherein the centrality values are calculated by numerically solving at least one eigenvalue equation associated with the graph.

17. The method of claim 15, wherein the partitions are scored based on semantic importance of the partitions, said semantic importance is a predefined function wherein at least one of variables of said function is from a combined set of said similarity coefficients and said centrality values of the partitions.

18. The method of claim 17, wherein the semantic importance scores of a first set of partitions are used to score the semantic importance of a second set of partitions.

19. The method of claim 17 wherein partitions are scored based on the resulting value of the semantic importance score of a partition divided by length of said partition, wherein said length is a predefined function that assigns a length value to each partition.

20. The method of claim 1 wherein said composition includes at least one of the followings:
  a content obtained from internet;
  at least one content obtained from a search engine database;
  at least one part of at least one patent disclosure from a non-empty set of patent disclosures filed in one or more countries;
  at least one content obtained from a user through a network communication.

21. The method of claim 1, wherein the scores of said ontological subjects of the first predefined order are assigned by processing the data of said one or more data arrays corresponding to said one or more participation matrices.

22. The method of claim 1, wherein the score of the partition is calculated by mathematical equivalent operation of matrix multiplication of vector of the scores of the ontological subject of the first predefined order into one or more columns or rows from at least one of said one or more participation matrices.

23. The method of claim 1 wherein said composition of ontological subjects is composed of one or more images.

24. A non-transitory computer-readable medium storing a computer program executable by one or more processing devices to perform a unified method of scoring partitions of a composition of ontological subjects comprising:
  instructions for obtaining at least one set of ontological subjects of a first predetermined order;
  instructions for partitioning the composition to a plurality of partitions having a second predefined order;
  instructions for constructing one or more data arrays corresponding to at least one participation matrix representing participation pattern of at least some of said ontological subjects of the first predefined order into one or more of said partitions of the second predefined order by having a non-zero value in the corresponding entries of the participation matrix, wherein each row of the participation matrix is representative of one of said extracted ontological subjects and each column of the participation matrix is representative of one said partitions or vice versa;
  instructions for assigning or calculating scores, according to one or more importance aspects of one or more predefined criteria of importance, to one or more of said ontological subjects of the first predefined order,
  instructions for constructing on one or more data arrays respective of assigned scores to said ontological subjects of the first predefined order according to one or more importance aspects; and
  instructions for scoring the partitions of the second predefined order by using said data respective of the score of the ontological subjects of the first predefined order and data of said at least one participation matrix.

25. A unified method of scoring partitions of a composition of ontological subjects, comprising:
  partitioning the composition to a plurality of partitions of a second predefined order;
  extracting, from the composition, at least one set of ontological subject of a first predefined order;
  constructing one or more data arrays corresponding to at least one participation matrix representing participation pattern of at least some of said extracted ontological subjects of the first predefined order into one or more of said partitions of the second predefined order by having a non-zero value in the corresponding entries of the participation matrix, wherein each row of the participation matrix is representative of one of said extracted ontological subjects and each column of the participation matrix is representative of said partitions or vice versa;

constructing one or more data arrays, corresponding to at least one matrix representing similarities of one or more pair of said some of partitions from data of said one or more data arrays corresponding to said at least one participation matrix; and scoring the partitions of the second predefined order based on the data of said at least one similarity matrix.

26. The method of claim 25, wherein the score of a partition of said composition of ontological subject is calculated by accumulation of similarity values, or mathematically equivalent formula, of said partition to one or more of other partitions of said composition of ontological subject.

27. A method of facilitating a service for a client over a network, comprising:

providing an access for the client over the network using one or more data communication devices, receiving signals or an input from the client, said input cause to identify the network address of a provider of said service, transmitting signals or data to the provider of said service, facilitating for exchanging signals or data between the client and the provider of said service, wherein said service is performed by at least one computer program, comprises of a set of instructions executable by one or more processors, to process a composition and provides:

at least one or more data arrays corresponding to one or more participation matrixes carrying data of participation patterns of one or more sets of ontological subjects of one or more first predefined orders into one or more pluralities of partitions of the composition, at least one non-empty list and/or at least one data array corresponding to scores of semantic importance of the partitions of the compositions, said score is an indicative measure of at least one significance aspect of a partition in the composition, estimated from data of one or more data arrays corresponding to at least one participation matrix carrying the data of participation pattern of ontological subjects of one or more first predefined orders into one or more pluralities of partitions of the composition, at least one partition of the composition selected based on data of one or more data arrays corresponding to one or more participation matrixes carrying the data of participation pattern of ontological subjects of one or more first predefined orders into one or more pluralities of partitions of the composition.

28. The method of claim 27, wherein the network is the Internet.

29. The method of claim 27, wherein said client comprises at least one computer program having instructions executable by at least one computer system, having at least one processing device, over the network.

30. The method of claim 27, wherein said provider of the service comprises at least one computer program having instructions executable by at least one computer system, having at least one processing device, over the network.

31. The method of claim 27 wherein the network comprises at least two processors that are performing from geographically different places.

32. A system for providing a service to a client comprising an integrated system of providing answers in response to a query or request, comprising:

one or more data input and/or communication devices for exchanging data signals with at least one computer system and/or a computer server, having at least one processor;

at least one computer executable program for processing a composition of ontological subjects comprises:

i. instructions for partitioning the composition into one or more pluralities of partitions, making one or more index lists for the partitions, and obtaining ontological subjects of at least one predefined order, ii. instructions for building one or more data arrays corresponding to one or more participation matrices carrying data of participation pattern of one or more ontological subjects of one or more first predefined orders into one or more pluralities of partitions of the composition of ontological subjects, iii. instructions for calculating score of the partitions based on at least one feature of significance in the participation pattern;

one or more computer systems and/or servers with access to repositories of data and/or compositions or partitions of said compositions;

computer programming instructions for building and/or accessing one or more data arrays corresponding to a first participation matrix indicating participation of a plurality of ontological subjects of a predefined order into a first plurality of partitions of a composition;

computer-program instructions that when executed by at least one processor, provides a first set of answer to the query by selecting some of the first partitions for which entries in the first participation matrix is non-zero;

computer programming instructions that when executed by at least one processor provides a plurality of second partitions by further partitioning of said selected some of the first partitions;

computer-programming instructions that when executed by at least one processor, builds and/or assembles a second participation matrix indicating the participation of the ontological subjects of a predefined order into said second partitions of said selected first partitions;

computer programming instructions that when executed by at least one processor, calculates scores of at least some of the second plurality of partitions using data of the second participation matrix;

computer programming instructions that when executed by at least one processor, selects one or more of the second partitions and present said selected second partitions in a predefined format, thereby providing at least a second set of answer in response to the query.

33. The system of claim 32, wherein further includes at least one non-transitory computer-readable storage medium to store one or more of the followings:

the composition;

at least some of said partitions of the compositions;

at least some of said ontological subjects of a predefined order, said at least one or more data arrays corresponding to one or more participation matrixes carrying the data of participation pattern of ontological subjects of one or more first predefined orders into one or more pluralities of partitions;

one or more lists of said partitions and/or ontological subjects of a predefined order.

34. The system of claim 32, further comprising:
- computer-program instructions that when executed builds a third participation matrix indicating participation of a plurality of the second partitions into a third plurality of partitions;
- computer-program instructions that when executed calculates scores of at least some of the third plurality of the partitions by multiplying a vector representing the scores of the second partitions to the third participation matrix;
- computer-program instructions that when executed provides at least a third set of answer in the form of at least one partitions from the third plurality of partitions selected based on the scores of third partitions, thereby providing a third set of answer in response to the query.

35. The system of claim 32, wherein at least one of said sets of answers is embedded in computer-readable codes that when executed by a client's computer system the answer is displayed on the client's display in a predefined format.

36. The system of claim 32, wherein the composition is assembled by said provider of the service in response to the client's input.

* * * * *